United States Patent
Ozawa et al.

(10) Patent No.: US 7,298,295 B2
(45) Date of Patent: Nov. 20, 2007

(54) METHOD, APPARATUS, SYSTEM, AND PROGRAM FOR CODE CONVERSION TRANSMISSION AND CODE CONVERSION RECEPTION OF AUDIO DATA

(75) Inventors: Kazunori Ozawa, Tokyo (JP); Hiroaki Dei, Tokyo (JP); Atsushi Hatabu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/443,692

(22) Filed: May 31, 2006

(65) Prior Publication Data

US 2006/0214824 A1 Sep. 28, 2006

Related U.S. Application Data

(62) Division of application No. 10/512,648, filed on Oct. 25, 2004, now Pat. No. 7,180,434.

(30) Foreign Application Priority Data

Apr. 26, 2002 (JP) ............................. 126600/2002

(51) Int. Cl.
*H03M 7/00* (2006.01)
(52) U.S. Cl. ............................. 341/60; 341/51; 341/50
(58) Field of Classification Search .................. 341/51, 341/60, 63, 65, 67, 107; 375/340, 377, 341, 375/262
See application file for complete search history.

(56) References Cited

U.S. PATENT DOCUMENTS

| | | | |
|---|---|---|---|
| 5,638,408 A | | 6/1997 | Takaki |
| 6,205,430 B1 * | | 3/2001 | Hui .............................. 704/500 |
| 6,230,125 B1 | | 5/2001 | Vainio |
| 6,356,870 B1 * | | 3/2002 | Hui et al. .................... 704/500 |
| 6,473,007 B2 * | | 10/2002 | Lyons et al. ................... 341/60 |
| 6,487,535 B1 * | | 11/2002 | Smyth et al. ................ 704/500 |
| 6,507,611 B1 * | | 1/2003 | Imai et al. .................... 375/222 |
| 6,850,179 B2 * | | 2/2005 | Toyama et al. ............. 341/160 |

(Continued)

FOREIGN PATENT DOCUMENTS

EP 1094630 4/2001

(Continued)

*Primary Examiner*—Linh Nguyen
(74) *Attorney, Agent, or Firm*—Scully, Scott, Murphy & Presser, PC

(57) ABSTRACT

A system and a method of suppressing outstanding degradation of decoded audio quality due to a transmission error of audio coded data are provided without feedback information from a receiver, thereby reducing the increase of the number of necessary transmission bands and the arithmetic complexity on the receiving side. A code conversion and transmission apparatus 100 for inputting audio coded data includes first to N-th code conversion and transmission units 102 and 104 to 106 for converting audio data to N pieces of coded data, and transmitting the data at predetermined or adaptively variable time intervals to M transmission lines 130. The second to N-th audio code conversion and transmission units 104 to 106 codes a frame at a compression rate equal to or higher than the rate of input coded data. The code conversion and reception apparatus 120 selects a transmission line using a selection unit 107, and selecting data from correctly received coded data in a frame or packet unit, thereby reconfiguring the coded data using a coded data reconfiguration unit 112.

16 Claims, 15 Drawing Sheets

U.S. PATENT DOCUMENTS

| | | | |
|---|---|---|---|
| 2005/0151676 A1* | 7/2005 | Evans | 341/61 |
| 2005/0188058 A1* | 8/2005 | Inoue | 709/219 |
| 2006/0062396 A1* | 3/2006 | Jin | 381/19 |

FOREIGN PATENT DOCUMENTS

| | | |
|---|---|---|
| JP | 2-71626 | 3/1990 |
| JP | 6-334573 | 12/1994 |
| JP | 8-23539 | 1/1996 |
| JP | 11-55226 | 2/1999 |
| JP | 11-225161 | 8/1999 |
| JP | 2000-78116 | 3/2000 |
| JP | 2000-236541 | 8/2000 |
| JP | 2000-244872 | 9/2000 |
| JP | 2001-7786 | 1/2001 |
| JP | 2001-144733 | 5/2001 |
| JP | 2002-077109 | 3/2002 |
| JP | 2003-134064 | 5/2003 |
| WO | WO 00/18057 | 3/2000 |
| WO | WO 03/030534 A1 | 4/2003 |

* cited by examiner

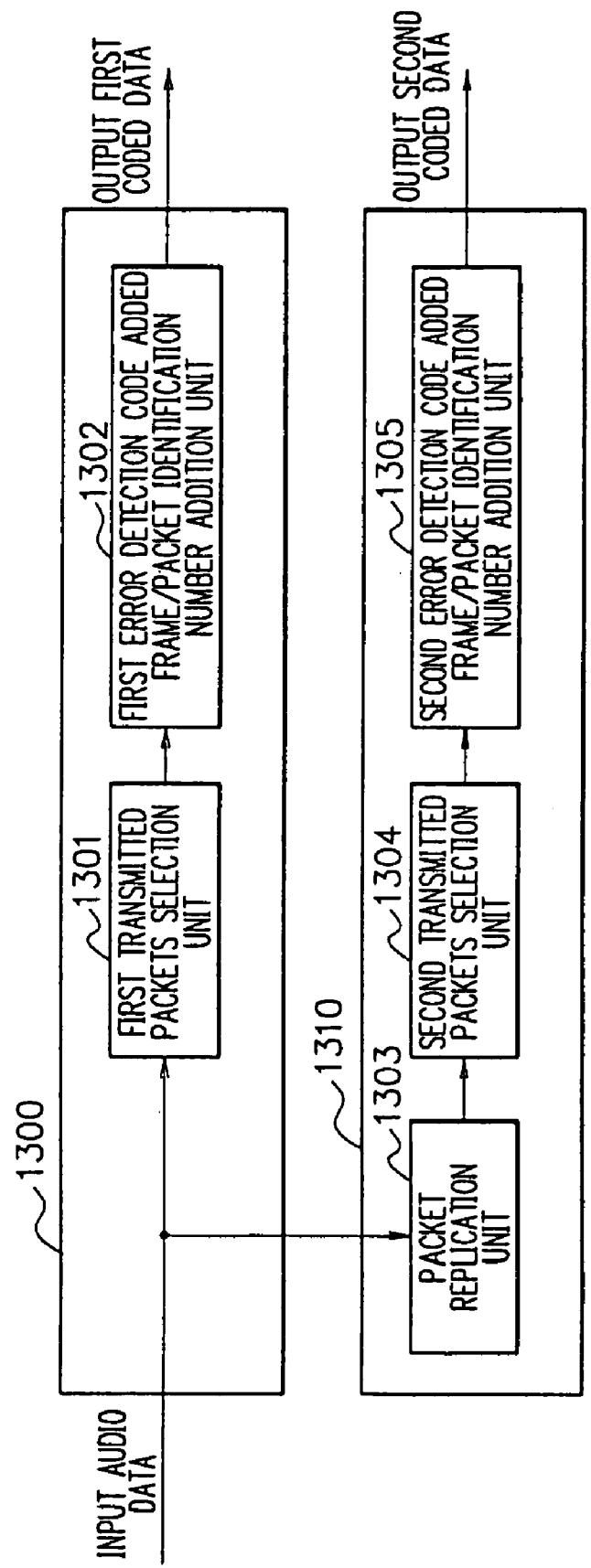
F I G. 12

METHOD, APPARATUS, SYSTEM, AND PROGRAM FOR CODE CONVERSION TRANSMISSION AND CODE CONVERSION RECEPTION OF AUDIO DATA

CROSS REFERENCE TO RELATED APPLICATION

The present application is a divisional application of application Ser. No. 10/512,648 filed on Oct. 25, 2004 now U.S. Pat. No. 7,180,434.

TECHNICAL FIELD

The present invention relates to an audio coded data transmission technology, and more specifically to a code conversion and transmission method for transmitting audio coded data, a code conversion and reception method for receiving coded and converted audio data, a system, an audio code conversion and transmission apparatus and a code conversion and reception apparatus, and a program executed by a computer for performing audio code conversion and transmission/audio code conversion and reception processes.

BACKGROUND ART

Recently, a method for transmitting high-efficiency compression coded data based on a modified discrete cosine transform (MDCT) has been widely used as a method for efficiently transmitting audio data. In this method, an audio signal is divided into frames, the MDCT is performed on the frames, the number of quantization bits are assigned to an MDCT coefficient based on a psychological audio model, the MDCT coefficient is quantized and transmitted. Thus, audio data can be transmitted using a small number of transmission bands by efficiently compressing and coding data.

A typical example is the MPEG (Moving Picture Expert Group)-4 AAC (Advanced Audio Coding), etc.

PROBLEMS THAT THE INVENTION IS TO SOLVE

However, in the conventional audio transmitting method, when a transmitted data error having long burst or a loss of a transmitted packet which are irrecoverable even by using an error-correcting code occurs, a receiver cannot correctly decode the audio data in the frame in which an error has occurred. A countermeasure of the receiver can be an error concealment method in which an error is replaced with an audio signal in a past frame for which data has been correctly decoded. However, in this case, the degradation of the sound quality cannot be avoided. When a coding efficiency is enhanced through intra-frame prediction of an MDCT coefficient, there occurs the problem that once arising degradation is propagated to the subsequent frames.

In the multicast/broadcast information distribution, a receiver cannot transmit to a transmitter the information about an error of transmitted data or a loss of a transmitted packet. When a receiver feeds back error information to a transmitter, the bands are occupied by the feedback information.

The present invention has been developed to solve the above-mentioned problems, and first aims at providing an audio data code conversion and transmission method, reception method, apparatus, system, and program capable of suppressing the outstanding degradation of a decoded audio signal caused by a transmission error of audio coded data and received by the receiver down to an audibly tolerable level.

The present invention second aims at providing an audio data code conversion and transmission method, reception method, apparatus, system, and program allowing a user to set the trade-off of the transmission band available in the transmission of audio data and audio quality.

The present invention third aims at providing an audio data code conversion and transmission method, reception method, apparatus, system, and program capable of preventing an increase in the arithmetic complexity required in decoding compressed audio coded data.

The present invention fourth aims at providing a method, apparatus, system, and program for attaining the first objective without transmitting the feedback information from a receiver to a transmitter.

DISCLOSURE OF THE INVENTION

The apparatus according to the present invention which solves at least one of the above-mentioned objectives is a code conversion and transmission apparatus which inputs audio coded data, converts it and outputs it to a transmission line. The apparatus includes a plurality of audio code conversion and transmission means for outputting a stream of the input audio coded data and a stream of audio coded data obtained by decoding and recoding the input audio coded data, or outputting plural pieces of audio coded data obtained by recoding the data obtained by decoding the input audio coded data. The plurality of audio code conversion and transmission means outputs all or a selected part of audio coded data and/or the recoded audio coded data, and the plurality of audio coded data from the plurality of audio code conversion and transmission means are output to one or more transmission lines. In the present invention, the code conversion and reception apparatus which receives audio coded data transmitted from the code conversion and transmission apparatus to the transmission line includes means for selecting a transmission line for receiving data from the one or more transmission lines, and means for receiving audio coded data from the selected transmission line, and reconfiguring audio coded data based on correctly received coded data.

The code conversion and transmission apparatus according to one aspect of the present invention includes:

(a) first audio code conversion and transmission means for inputting compressed audio coded data, and outputting all or a part of frames of the input audio coded data;

(b) second to N-th (N is a predetermined integer equal to or larger than 2) audio code conversion and transmission means for decoding all or a part of input audio coded data, coding data obtained by decoding data, and outputting all or a part of frames of obtained coded data; and (c) means for transmitting output of the first to N-th audio code conversion and transmission means to first to M-th (M is a predetermined integer equal to or larger than 1) transmission lines.

The code conversion and transmission apparatus according to another aspect of the present invention includes:

(a) first audio code conversion and transmission means for inputting compressed audio coded packet data and outputting all or a part of packets of the input audio coded data;

(b) second to N-th (N is a predetermined integer equal to or larger than 2) audio code conversion and transmission means for decoding the input audio coded packet data, coding data obtained by decoding data, and outputting all or a part of obtained packet data; and (c) means for transmitting output of the first to N-th audio code conversion and transmission means to first to M-th (M is a predetermined integer equal to or larger than 1) transmission lines.

The code conversion and reception apparatus according to another aspect of the present invention includes:

(e) selection means for selecting a transmission line for receiving coded data from first to M-th (M is a predetermined integer equal to or larger than 1) transmission lines; and (f) means for receiving coded data from the transmission line selected by the selection means, extracting coded data received without a transmission error or a loss, reconfiguring coded data based on the extracted coded data and outputting the result.

The code conversion and reception apparatus according to another aspect of the present invention includes:

(e) selection means for selecting a transmission line for receiving coded data from first to M-th (M is a predetermined integer equal to or larger than 1) transmission lines; and (f) means for receiving coded data from the transmission line selected by the selection means, extracting coded packet data received without a transmission error or a loss, reconfiguring coded packet data based on the extracted coded packet data, and outputting the result.

The code conversion and transmission method according to another aspect of the present invention includes:

(a) a step of first audio code conversion and transmission means inputting compressed audio coded data, and outputting all frames (or packets) or a part of frames (or packets) of the input audio coded data;

(b) a step of second to N-th (N is a predetermined integer equal to or larger than 2) audio code conversion and transmission means decoding all or a part of input audio coded data, coding data obtained by decoding data, and outputting all frames (or packets) or a part of frames (or packets) of the obtained coded data; and (c) a step of transmitting output of the first to N-th audio code conversion and transmission means to first to M-th (M is a predetermined integer equal to or larger than 1) transmission lines.

The code conversion and reception method according to another aspect of the present invention includes:

(d) a step of selecting a transmission line for receiving audio coded data from first to M-th (M is a predetermined integer equal to or larger than 1) transmission lines; and (e) a step of receiving coded data from the selected transmission line, extracting audio coded data (packet) received without an transmission error and a loss, reconfiguring audio coded data based on the extracted coded data (packet data), and outputting the result.

The computer program according to another aspect of the present invention used to direct a computer forming part of the audio data code conversion and transmission apparatus and having first audio code conversion and transmission means and second to N-th (N is a predetermined integer equal to or larger than 2) audio code conversion and transmission means, to perform a code conversion and transmission process on audio coded data, includes:

(a) a process of first audio code conversion and transmission means inputting compressed audio coded data, and outputting all frames or a part of frames of the input audio coded data;

(b) a process of second to N-th (N is a predetermined integer equal to or larger than 2) audio code conversion and transmission means decoding all or a part of input audio coded data, coding data obtained by decoding data, and outputting all frames or a part of frames of the obtained coded data; and (c) a process of transmitting output of the first to N-th audio code conversion and transmission means to first to M-th (M is a predetermined integer equal to or larger than 1) transmission lines.

The computer program according to another aspect of the present invention is used to direct a computer forming part of the audio data code conversion and reception apparatus to perform the code conversion process on audio coded data including:

(d) a process of selecting at least one transmission line from M ((M is a predetermined integer equal to or larger than 1) transmission lines;

(e) a process of receiving audio coded data from the selected transmission line, extracting coded data (packet data) received without a transmission error and a loss, reconfiguring audio coded data based on the extracted coded data (packet data), and outputting the result.

SUMMARY OF THE INVENTION

In the present invention, to prevent the audio quality from being exceedingly degraded by a transmission error of compressed audio coded data, the code conversion and transmission apparatus receives coded data from the audio coding apparatus, converts data into a format for protection of data against a loss or an error in a transmission line, and transmits data to the code conversion and reception apparatus.

In the present invention, the code conversion and transmission apparatus includes the first to N-th audio code conversion and transmission means and transmission means to the first to N-th transmission lines, compresses and codes the audio data into N pieces of coded data, and transmits the data. The code conversion and reception apparatus selects coded data having the lowest compression rate and a higher audio quality level in the coded data correctly received from M transmission lines, and decodes the selected data.

In the present invention, the N pieces of coded data obtained by the first to N-th audio code conversion and transmission means are transmitted by being arranged at predetermined or adaptively variable time intervals.

In the present invention, the code conversion and reception apparatus selects coded data having the lowest compression rate and a higher audio quality from correctly received coded data in a frame or packet unit from at least one transmission line in M pieces of transmission lines, and decodes the selected data.

Additionally, according to the present invention, the compression rate for the first to N-th audio code conversion and transmission means can be selected depending on the transmission band available in the first to M-th transmission lines. The second to N-th audio code conversion and transmission means can code data at a compression rate equal to or higher than the rate of the first audio code conversion and transmission means, or can arbitrarily set the rate.

In the present invention, to prevent the arithmetic complexity from increasing on the receiving side in transmitting plural pieces of coded data, the code conversion and transmission apparatus generates the same frame of coded data, and the receiver selects at least one frame or packet of data from the received plural pieces of coded data, and decodes the selected data.

To be more practical, in the audio data conversion and transmission system according to the first aspect of the present invention, the code conversion and transmission apparatus includes for an integer N of 2 or larger and an integer M of 1 or larger: a) first audio code conversion and transmission means for inputting compressed coded data, and transmitting all frames or a part of frames adaptively selected depending on the characteristics of input audio data or according to a predetermined rule using predetermined transmission means; b) (N−1) units of the second to N-th audio code conversion and transmission means for decoding input coded data, compressing and coding data at a compression rate equal to or higher than the rate of the first audio code conversion and transmission means, and transmitting all frames of obtained coded data or a part of frames adaptively selected depending on the characteristic of input audio data or according to a predetermined rule at predetermined or adaptively variable time intervals using transmission means the same as or different from the transmission means of the first audio code conversion and transmission means; and c) means for selecting a compression rate for coding of at least one of the first to N-th audio code conversion and transmission means depending on the band available for each of the first to M-th transmission lines, and transmitting it to the first to M-th transmission lines.

The code conversion and reception apparatus includes d) selection means for selecting at least one transmission line from M transmission lines, receiving N pieces of coded data from the selected transmission line, extracting coded data received without a transmission error or a loss, selecting audio coded data from the coded data in the same frame based on a compression rate, and outputting the selected data.

In the audio data conversion and transmission system according to the second aspect of the present invention, the code conversion and transmission apparatus includes for an integer N of 2 or larger and an integer M of 1 or larger: a) first audio code conversion and transmission means for inputting compressed coded packet data, and transmitting all packets or a part of packets adaptively selected depending on the characteristics of input audio data or according to a predetermined rule using predetermined transmission means; b) (N−1) units of the second to N-th audio code conversion and transmission means for decoding input coded packet data, compressing and coding data into packet data at a compression rate equal to or higher than the rate of the first audio code conversion and transmission means, and transmitting all obtained packet data or packet data adaptively selected depending on the characteristic of input audio data or according to a predetermined rule at predetermined or adaptively variable time intervals using transmission means the same as or different from the transmission means of the first audio code conversion and transmission means; and c) means for selecting a compression rate for coding of at least one of the first to N-th audio code conversion and transmission means depending on the band available for each of the first to M-th transmission lines, and transmitting it to the first to M-th transmission lines.

The code conversion and reception apparatus includes selection means for selecting at least one transmission line from M transmission lines, receiving up to N pieces of coded data from the selected transmission line, selecting coded packet data received without a transmission error or a loss from the packet data in the same frame based on a compression rate, and outputting the selected data.

In the audio data conversion and transmission system according to the third aspect of the present invention, the code conversion and transmission apparatus includes, for an integer N of 2 or larger and an integer M of 1 or larger: d) first audio code conversion and transmission means for inputting compressed coded data, compressing and coding all frames of decoded audio data or a part of frames selected depending on the characteristic of input audio data or according to a predetermined rule at a compression rate equal to or higher than the rate of the input audio data, and transmitting obtained coded data using predetermined transmission means; e) (N−1) units of the second to N-th audio code conversion and transmission means for coding all frames coded by the first audio code conversion and transmission means or a part of frames adaptively selected depending on the characteristic of input audio data or according to a predetermined rule at a compression rate equal to or higher than the rate of the first audio code conversion and transmission means, and transmitting obtained coded data at predetermined or adaptively variable time intervals using transmission means the same as or different from the transmission means of the first audio code conversion and transmission means; and f) means for selecting a compression rate for coding for at least one of the first to N-th audio code conversion and transmission means depending on the band available for each of the first to M-th transmission lines, and transmitting it to the first to M-th transmission lines.

The code conversion and reception apparatus includes g) selection means for selecting at least one transmission line from M transmission lines, receiving N pieces of coded data from the selected transmission line, extracting coded data received without a transmission error or a loss, selecting audio coded data from the coded data in the same frame based on a compression rate, and outputting the selected data.

In the audio data conversion and transmission system according to the fourth aspect of the present invention, the code conversion and transmission apparatus includes for an integer N of 2 or larger and an integer M of 1 or larger: a) first audio code conversion and transmission means for decoding input coded packet data, compressing and coding the data at a compression rate equal to or higher than the rate of the input audio data, and transmitting the obtained one or more pieces of coded packet data using predetermined transmission means; b) (N−1) units of the second to N-th audio code conversion and transmission means for coding all packet data coded by the audio code conversion and transmission means or packet data adaptively selected depending on the characteristic of input audio data or according to a predetermined rule into packet data at a compression rate equal to or higher than the rate of the first audio code conversion and transmission means, and transmitting the obtained coded packet data at predetermined or adaptively variable time intervals using transmission means the same as or different from the transmission means of the first audio code conversion and transmission means; and c) means for selecting a compression rate for coding for at least one of the first to N-th audio code conversion and transmission means depending on the band available for the first to M-th transmission line, and transmitting it to the first to M-th transmission lines.

The code conversion and reception apparatus includes d) selection means for selecting at least one transmission line from M transmission lines, receiving N pieces of coded data from the selected transmission line, selecting coded packet data which has the lowest compression rate from the packet data of the same frame received without a transmission error or a loss, and outputting the selected data.

In the audio data conversion and transmission system according to the fifth aspect of the present invention, the code conversion and transmission apparatus includes for an integer N of 2 or larger and an integer M of 1 or larger: a) first audio code conversion and transmission means for inputting coded packet data and transmitting all or a part of the frames/packets using predetermined transmission means; b) (N–1) units of the second to N-th audio code conversion and transmission means for replicating packets for all packet data coded by the first audio coding means or packet data adaptively selected depending on the characteristic of input audio data or according to a predetermined rule, and transmitting the obtained packet data at predetermined or adaptively variable time intervals using transmission means the same as or different from the transmission means of the first audio code conversion and transmission means; and c) means for transmitting output of the first to N-th audio code conversion and transmission means to the first to M-th transmission lines.

The code conversion and reception apparatus includes d) selection means for selecting at least one transmission line from M transmission lines, receiving N pieces of coded data from the selected transmission line, selecting coded packet data which is received without a transmission error or a loss from the packet data of the same frame, and outputting the selected data.

In the audio data conversion and transmission system according to the sixth aspect of the present invention, the code conversion and transmission apparatus includes for an integer N of 2 or larger and an integer M of 1 or larger: a) first audio code conversion and transmission means for inputting compressed coded data, decoding the input coded data, compressing and coding the data at a compression rate equal to or higher than the rate of the input coded data, and transmitting all frames or a frame adaptively selected depending on the characteristic of input audio data or according to a predetermined rule using predetermined transmission means; b) (N–1) units of the second to N-th audio code conversion and transmission means for decoding input coded data, compressing and coding data at a compression rate equal to or higher than the rate of the first audio code conversion and transmission means, and transmitting all frames of the obtained coded data or a frame adaptively selected depending on the characteristic of input audio data or according to a predetermined rule at predetermined or adaptively variable time intervals using transmission means the same as or different from the transmission means of the first audio code conversion and transmission means; and c) means for selecting a compression rate for coding for at least one of the first to N-th audio code conversion and transmission means depending on the band available for each of the first to M-th transmission lines, and transmitting the selected result to the first to M-th transmission lines.

The code conversion and reception apparatus includes d) selection means for selecting at least one transmission line from M transmission lines, receiving N pieces of coded data from the selected transmission line, extracting coded data received without a transmission error or a loss, selecting audio coded data having the lowest compression rate from the coded data in the same frame, and outputting the selected data.

In the audio data conversion and transmission system according to the seventh aspect of the present invention, the code conversion and transmission apparatus includes for an integer N of 2 or larger and an integer M of 1 or larger: a) first audio code conversion and transmission means for inputting compressed coded packet data, decoding the input coded packet data, compressing and coding data at a compression rate equal to or higher than the rate of the input coded data, and transmitting all packets or a packet adaptively selected depending on the characteristic of input audio data or according to a predetermined rule using predetermined transmission means; b) (N–1) units of the second to N-th audio code conversion and transmission means for decoding input coded packet data, compressing and coding data into packet data at a compression rate equal to or higher than the rate of the first audio code conversion and transmission means; and transmitting all obtained packet data or a part of packet data adaptively selected depending on the characteristic of input audio data or according to a predetermined rule at predetermined or adaptively variable time intervals using transmission means the same as or different from the transmission means of the first audio code conversion and transmission means; and c) means for selecting a compression rate for coding for at least one of the first to N-th audio code conversion and transmission means depending on the band available for each of the first to M-th transmission lines, and transmitting it to the first to M-th transmission lines.

The code conversion and reception apparatus includes d) selection means for selecting at least one transmission line from M transmission lines, receiving N pieces of coded data from the selected transmission line, selecting coded packet data which has the lowest compression rate from the packet data of the same frame received without a transmission error or a loss, and outputting the selected data.

BRIEF DESCRIPTION OF THE DRAWINGS

FIG. 12 shows the configuration of the audio code conversion and transmission apparatus according to the seventh embodiment of the present invention.

Figure 1:
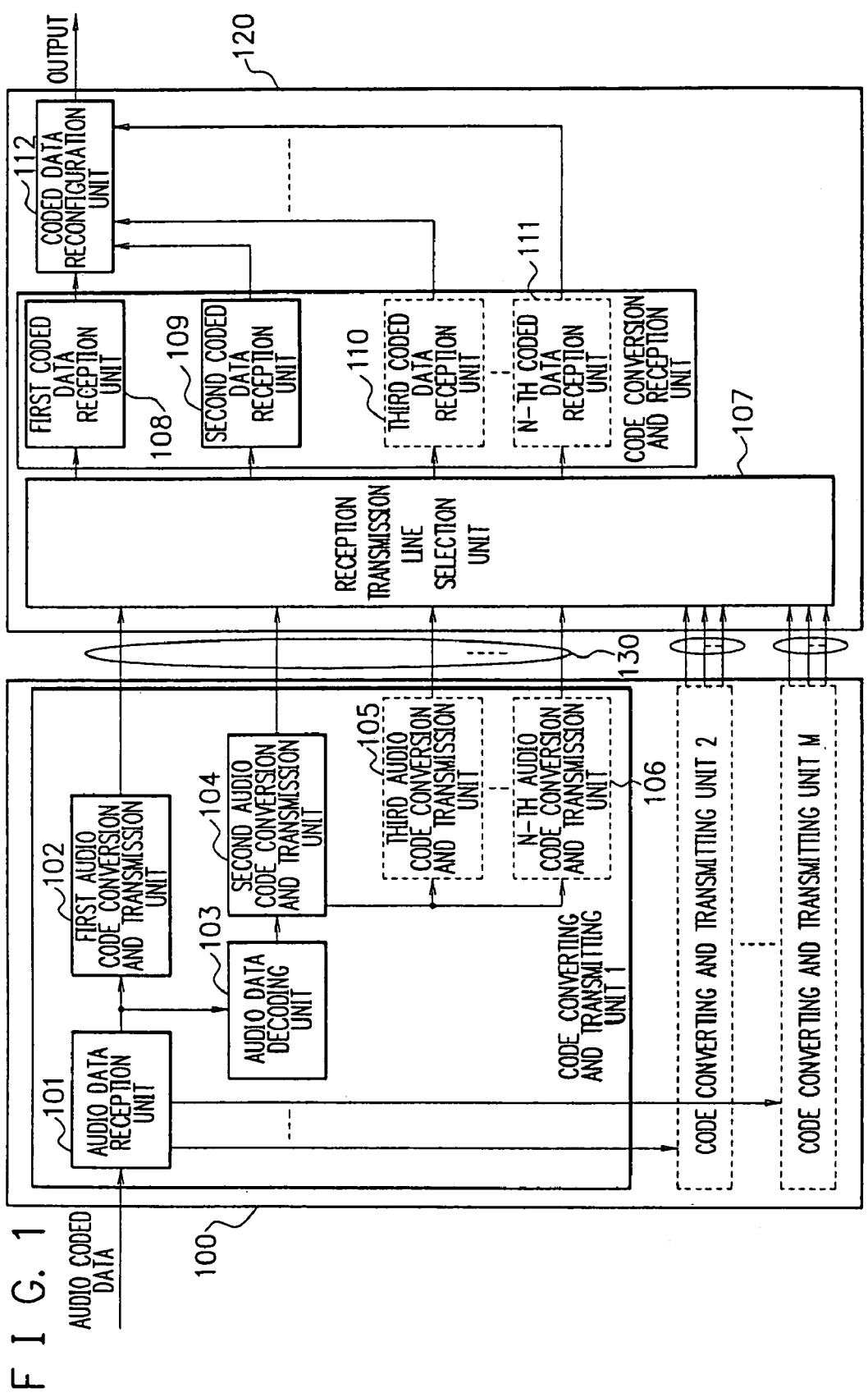
FIG. 1 shows the audio data transmission system according to the first and second embodiments of the present invention.

The reference numeral 10 represents a code conversion and transmission apparatus. The reference numeral 13 represents a transmission line. The reference numeral 20 represents a code conversion and reception apparatus. The reference numeral 30 represents a decoding apparatus. The reference numeral 40 represents a coding apparatus. The reference numeral 101 represents an audio data reception unit. The reference numeral 102 represents a first audio data code conversion and transmission unit. The reference numeral 103 represents a first audio data decoding unit. The reference numeral 104 represents a second audio data code conversion and transmission unit. The reference numeral 105 represents a third audio data code conversion and transmission unit. The reference numeral 106 represents an N-th audio data code conversion and transmission unit. The reference numeral 107 represents a reception line selection unit. The reference numeral 100 represents a code conversion and transmission apparatus. The reference numeral 108 represents a first coded data reception unit. The reference numeral 109 represents a first coded data reception unit. The reference numeral 110 represents a third coded data reception unit. The reference numeral 111 represents an N-th coded data reception unit. The reference numeral 112 represents a coded data reconfiguration unit. The reference numeral 120 represents a code conversion and reception apparatus. The reference numeral 130 represents a transmission line. The reference numeral 200 represents a first audio code conversion transmission unit. The reference numeral 201 represents a first transmission frame/packet selection unit. The reference numeral 202 represents a first error detection code added frame/packet identification number addition unit. The reference numeral 203 represents a decoding unit. The reference numeral 206 represents a second compression and coding unit. The reference numeral 207 represents a second coded packet generation unit. The reference numeral 208 represents a second error detection code added frame/packet identification number addition unit. The reference numeral 212 represents a third compression coding unit. The reference numeral 213 represents a third coded packet generation unit. The reference numeral 214 represents a third error detection code added frame/packet identification number addition unit. The reference numeral 220 represents a second audio code conversion transmission unit. The reference numeral 230 represents a third audio code conversion transmission unit. The reference numeral 300 represents a reception line selection unit. The reference numeral 301 represents a first packet reception buffer. The reference numeral 302 represents a first coded data extraction unit. The reference numeral 303 represents a first error/packet loss detection unit. The reference numeral 304 represents a second packet reception buffer. The reference numeral 305 represents a second coded data extraction unit. The reference numeral 306 represents a second error/packet loss detection unit. The reference numeral 307 represents a third packet reception buffer. The reference numeral 308 represents a third coded data extraction unit. The reference numeral 309 represents a third error/packet loss detection unit. The reference numeral 310 represents a coded data reconfiguration unit. The reference numeral 320 represents a first coded data reception unit. The reference numeral 330 represents a second coded data reception unit. The reference numeral 340 represents a third coded data reception unit. The reference numeral 501 represents an audio code conversion apparatus. The reference numerals 502, 503, 506, and 507 represent delay addition units. The reference numerals 505 and 509 represent transmission lines. The reference numeral 510 represents a transmission line selection unit. The reference numeral 511 represents a separation unit. The reference numeral 512 represents an audio reception and decoding apparatus. The reference numeral 700 represents a code conversion and transmission apparatus. The reference numeral 701 represents an audio data reception unit. The reference numeral 702 represents an audio data decoding unit. The reference numeral 703 represents a first audio code conversion and transmission unit. The reference numeral 704 represents a second audio code conversion and transmission unit. The reference numeral 705 represents an N-th audio code conversion and transmission unit. The reference numeral 706 represents a reception line selection unit. The reference numeral 707 represents a first coded data reception unit. The reference numeral 708 represents a second coded data reception unit. The reference numeral 709 represents an N-th coded data reception unit. The reference numeral 710 represents a coded data reconfiguration unit. The reference numeral 720 represents an audio code conversion and reception apparatus. The reference numeral 730 represents a transmission line. The reference numeral 800 represents a first audio code conversion and transmission unit. The reference numeral 801 represents a decoding unit. The reference numeral 804 represents a first compression and coding unit. The reference numeral 805 represents a first coded packet generation unit. The reference numeral 806 represents a first error detection code added frame/packet identification number addition unit. The reference numeral 810 represents a second compression and coding unit. The reference numeral 811 represents a second coded packet generation unit. The reference numeral 812 represents a second error detection code added frame/packet identification number addition unit. The reference numeral 1201 represents an audio data reception unit. The reference numeral 1202 represents a first audio code conversion and transmission unit. The reference numeral 1203 represents an audio data replication unit. The reference numeral 1204 represents a second audio code conversion and transmission unit. The reference numeral 1205 represents an N-th audio code conversion and transmission unit. The reference numeral 1206 represents a reception line selection unit. The reference numeral 1207 represents a first coded data reception unit. The reference numeral 1208 represents a second coded data reception unit. The reference numeral 1209 represents an N-th coded data reception unit. The reference numeral 1210 represents a coded data reconfiguration unit. The reference numeral 1300 represents a first audio code conversion and transmission unit. The reference numeral 1301 represents a first transmitted packets selection unit. The reference numeral 1302 represents a first error detection code added frame/packet identification number addition unit. The reference numeral 1303 represents a packet replication unit. The reference numeral 1304 represents a second transmitted packets selection unit. The reference numeral 1305 represents a second error detection code added frame/packet identification number addition unit. The reference numeral 1310 represents a second audio code conversion and transmission unit. The reference numeral 1401 represents an audio data reception unit. The reference numeral 1402 represents an audio data decoding unit. The reference numeral 1403 represents a first audio code conversion and transmission unit. The reference numeral 1404 represents a second audio code conversion and transmission unit. The reference numeral 1405 represents an N-th audio code conversion and transmission unit. The reference numeral 1406 represents a reception line selection unit. The reference numeral 1407 represents a first coded data reception unit. The reference numeral 1408 represents a second coded data reception unit. The reference numeral 1409 represents an N-th coded data reception unit. The reference numeral 1410 represents a coded data reconfiguration unit. The reference numeral 1500 represents a first audio code conversion and transmission unit. The reference numeral 1501 represents a decoding unit. The reference numeral 1502 represents a first transmitted frame/packet coding unit. The reference numeral 1503 represents a first error detection code added frame/packet identification number addition unit. The reference numeral 1504 represents a second transmitted frame/packet coding unit. The reference numeral 1505 represents a first error detection code added frame/packet identification number addition unit. The reference numeral 1510 represents a second audio code conversion and transmission unit.

BEST MODE FOR CARRYING OUT THE INVENTION

A description will be given of embodiments of the present invention. In the first embodiment of the present invention, a code conversion and transmission apparatus includes for an integer N of 2 or larger and an integer M of 1 or larger: a) first audio code conversion and transmission means (102 shown in FIG. 1) for inputting compressed coded data, and transmitting all frames or a part of frames adaptively selected depending on the characteristics of input audio data or according to a predetermined rule using predetermined transmission means; b) (N−1) units of the second to N-th audio code conversion and transmission means (104, 105, and 106 shown in FIG. 1) for decoding input coded data, compressing and coding data at a compression rate equal to or higher than the rate of the first audio code conversion and transmission means, and transmitting all frames of obtained coded data or a part of frames adaptively selected depending on the characteristic of input audio data or according to a predetermined rule at predetermined or adaptively variable time intervals using transmission means the same as or different from the transmission means of the first audio code conversion and transmission means; and c) means for selecting a compression rate for coding of at least one of the first to N-th audio code conversion and transmission means depending on the band available for each of the first to M-th transmission lines, and transmitting it to the first to M-th transmission lines.

The code conversion and reception apparatus includes d) means (107 shown in FIG. 1) for selecting at least one transmission line from M transmission lines, and means (112 shown in FIG. 1) for receiving N pieces of coded data from the selected transmission line, extracting coded data received without a transmission error or a loss, selecting audio coded data with the lowest compression rate from the coded data in the same frame, and outputting the selected data. The process and function of each means of the code conversion and transmission apparatus and the code conversion and reception apparatus can be realized by a program executed by a computer configuring the code conversion and transmission apparatus and the code conversion and reception apparatus.

EMBODIMENT

For detailed explanation about the mode for carrying out the present invention, the first embodiment of the present invention will be explained referring to the drawings.

(1.A) Summary

FIG. 1 shows the configuration of the first embodiment of the present invention. As shown in FIG. 1, the first embodiment of the present invention comprises an audio data code conversion and transmission apparatus 100, an audio data code conversion and reception apparatus 120 and transmission lines 130 for transmitting coded data. The integer N indicates the number of pieces of coded data transmitted by the code conversion and transmission apparatus, and is 2 or larger. The integer M indicates the number of the transmission lines 130 for transmitting N pieces of coded data, and is 1 or larger.

The code conversion and transmission apparatus 100 inputs audio data coded by an audio coding apparatus (not shown in the drawings), codes the input audio data into N pieces of coded data, and transmits the resultant data as first to N-th audio coded data to the first to M-th transmission lines. As shown in FIG. 1, the unit 110 comprises first to N-th audio code conversion and transmission units 102 to 106 to transmit data to the first to M-th transmission lines.

As shown in FIG. 1, the code conversion and transmission apparatus 100 comprises M units of code converting and transmitting units 1 to M for the first to M-th transmission lines 130. The code converting and transmitting units 1 to M transmit coded data to M pieces of the first to M-th transmission lines 130.

The code converting and transmitting units 1 to M comprise the first to N-th audio code conversion and transmission units 102 and 104 to 106, and output first to N-th audio streams. The code converting and transmitting units 2 to M commonly input the audio coded data once received by the code converting and transmitting unit 1. Otherwise, they are similar in configuration to the code converting and transmitting unit 1. FIG. 1 shows only the configuration of the code converting and transmitting unit 1 for simplicity. In the following, a description will be made of the code converting and transmitting unit 1, but the explanation of the code converting and transmitting units 2 to M will be omitted.

The audio data reception unit 101 of the code converting and transmitting unit 1 receives audio coded data. The audio coded data received by the audio data reception unit 101 of the code converting and transmitting unit 1 is also provided for the code converting and transmitting units 2 to M.

The first audio code conversion and transmission unit 102 transmits all or a part of the frames of the input audio data to the code conversion and reception apparatus 120.

The input audio data is decoded by the audio data decoding unit 103, and the second audio code conversion and transmission unit 104 compresses and codes the obtained audio data in a predetermined method at a compression rate equal to or higher than the rate of the first audio stream, and transmits the coded data to the code conversion and reception apparatus 120.

When N is 3 or larger, the third to N-th audio code conversion and transmission units 105 to 106 code all or a part of frames coded by the first audio code conversion and transmission unit 102 at a compression rate equal to or higher than the rate of the second audio code conversion and transmission unit 104, and transmit the obtained coded data to the code conversion and reception apparatus 120. The first to N-th audio streams are transmitted to the first to M-th transmission lines 130.

The first to N-th audio data streams of the code converting and transmitting units 1 to M are transmitted to the first to M-th transmission lines 130. Depending on the available bands of the audio data in each transmission line 130, the compression rate of the second to N-th audio code conversion and transmission units 104 to 106 can be selected. Thus, the output of the first audio code conversion and transmission unit 102 and the output of the second to N-th audio code conversion and transmission units 104 to 106, whose compression rates have been controlled, are output to the first to M-th transmission lines 130. In this embodiment, data can be transmitted based on the status of the transmission line or the intention of the transmitter of audio data.

Instead of providing a plurality of code converting and transmitting units 1 to M, the output of the first to N-th audio code conversion and transmission units of one code converting and transmitting unit 1 can be distributed to the first to M-th transmission lines 130. Furthermore, the output paths of the code converting and transmitting units 1 to M can be switched, and the connection of the first to M-th transmission lines 130 can be switched.

In the code conversion and reception apparatus 120, a reception line selection unit 107 selects at least one transmission line from M transmission lines 130 through which data are transmitted by the code conversion and transmission apparatus 100, N pieces of coded data are received from the selected transmission lines, and decoded.

The code conversion and reception apparatus 120 comprises first to N-th coded data reception units 108 to 111 which receive coded data transmitted from the first to N-th audio code conversion and transmission units 102 to 106 of the code conversion and transmission apparatus 100 and a coded data reconfiguration unit 112 as shown in FIG. 1.

The coded data reconfiguration unit 112 selects data having, for example, the lowest compression rate from the maximum of N pieces of coded data received without a transmission error or a loss by the coded data reception units 108 to 111, and outputs the selected data.

Thus, according to the present embodiment, the code conversion and transmission apparatus which transmits audio data coded by the audio coding apparatus, not shown in the drawings, comprises a data reception unit 101 for receiving data from the audio coding apparatus, converts audio data to N pieces of coded data, and transmits each piece of data to the M transmission lines at predetermined or adaptively variable time intervals. The second to N-th audio code conversion and transmission means (first to N-th audio code conversion and transmission unit) 104 to 106 code the frame coded by the first audio code conversion and transmission unit 102 at a compression rate equal to or higher than the rate of the first compressing and coding method. On the receiver side, the reception line selection unit 107 selects a transmission line, and the coded data reconfiguration unit 112 selects coded data having the lowest compression rate and having high audio quality from the correctly received coded data in a frame or packet unit, and decodes the selected data. The detailed explanation will be given below.

(1.B) Code Conversion and Transmission Apparatus

Figure 2:
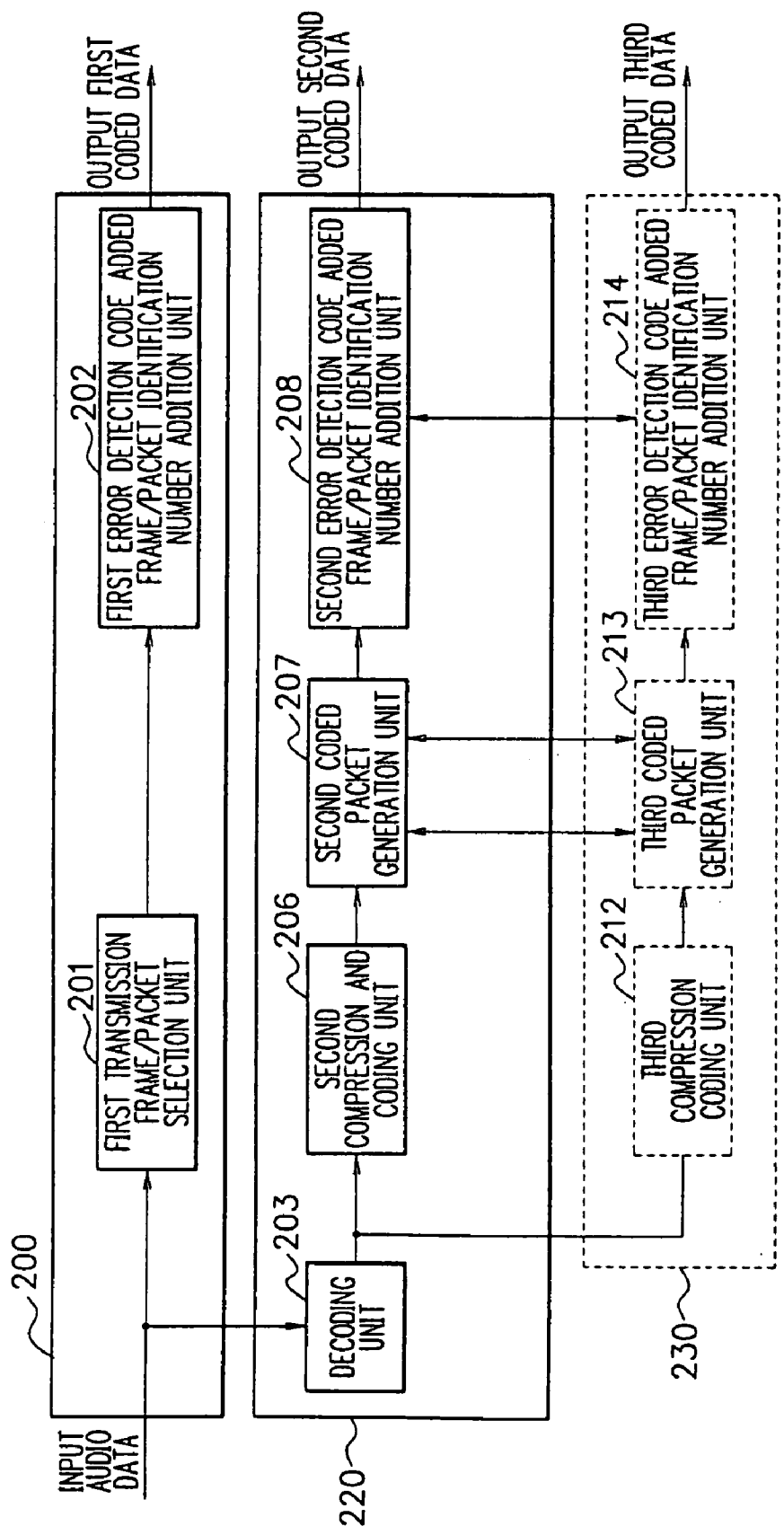
FIG. 2 shows the configuration of the audio code conversion and transmission apparatus according to the first and second embodiments of the present invention.

FIG. 2 shows the detailed configuration of the audio code conversion and transmission apparatus according to the first embodiment of the present invention. For simplicity, the number N of pieces of coded data output by the apparatus is set to 3, and the number M of transmission lines for transmitting coded data is set to 2. In FIG. 2, a first audio code conversion transmission unit 200 corresponds to the first audio code conversion and transmission unit 102 shown in FIG. 1, a second audio code conversion transmission unit 220 corresponds to the second audio code conversion and transmission unit 104 shown in FIG. 1, a decoding unit 203 corresponds to the first audio data decoding unit 103 shown in FIG. 1, and a third audio code conversion transmission unit 230 corresponds to the third audio code conversion and transmission unit 105 shown in FIG. 1.

In the first audio code conversion transmission unit 200, a first transmission frame/packet selection unit 201 selects an adaptively transmitted frame from among input audio frames depending on the characteristic of the input audio data and the status of the transmission line. In adaptively selecting a frame, storage means stores in advance a rule for determination whether or not a frame is selected based on the characteristic of audio data (for example, the parameter of an audio signal having an influence on audio quality, sound/soundless, etc.) and the status of a transmission line (for example, the status of an occurrence of a transmission error, etc.). The first transmission frame/packet selection unit 201 can refer to the rule, and dynamically select a frame at any time based on the comparison result with the analysis result (or transmission status) of audio data. When the transmission frame/packet selection unit according to another embodiment described below adaptively (dynamically) selects a frame/packet according to the rule, a frame/packet can be selected by referring to the rule. The rule according to which a frame/packet is selected can also be dynamically variable.

A first error detection code added frame/packet identification number addition unit 202 adds an error detection code and a frame/packet identification number for detecting a transmission error and a packet loss in output coded packet data in the reception apparatus, and the first audio coded data is output.

In FIG. 2, in the second audio code conversion transmission unit 220, the decoding unit 203 decodes input audio coded data.

The second compression and coding unit 206 compresses and codes the decoded data obtained by the decoding unit 203 in a predetermined method.

A second coded packet generation unit 207 codes the compressed data obtained by the second compression and coding unit 206 into variable bit string, and outputs the resultant data in a predetermined packet unit.

A second error detection code added frame/packet identification number addition unit 208 adds an error detection code and a frame/packet identification number for detecting a transmission error and a packet loss of the coded packet data output by the second coded packet generation unit 207 in the reception apparatus, and outputs the second audio coded data.

In the third audio code conversion transmission unit 230, a third compression coding unit 212 codes the audio data obtained by the decoding unit 203 at a compression rate equal to or higher than the rate of the second compression and coding unit 206.

A third coded packet generation unit 213 codes the compressed data obtained by the third compression coding unit 212 into variable bit string, and outputs the coded data in a predetermined packet unit.

A third error detection code added frame/packet identification number addition unit 214 adds an error detection code and a frame/packet identification number for detection by the reception apparatus of a transmission error and a packet loss in the compressed packet data output by the third coded packet generation unit 213, outputs the third audio coded data, and predetermined transmission means transmits the data in a packet unit.

In the present embodiment, M is set to 2, and N is set to 3. Therefore, the first to third audio code conversion and transmission data are transmitted to each of the two transmission lines.

In the present embodiment, the output of the second to N-th coded data can be separately transmitted from the output of the first coded data at time intervals, or the second to N-th coded data can be multiplexed with the first coded data and transmitted.

The first error detection code added frame/packet identification number addition unit 202 is provided to add an error detection code and a frame/packet identification number to the first coded data output from the first transmission frame/packet selection unit 201. However, it can be omitted if the information has already been added to the input audio packet data. If the transmission error and the packet loss of the transmitted coded packet data can be detected by the code conversion and reception apparatus in any other methods, they can be used. For example, if there is a mechanism of detecting a transmission error in a transmission line of the first coded packet, then it is not necessary to add an error detection code by the first error detection code added frame/packet identification number addition unit 202. In another example, if information for identification of a frame and a packet is contained in the coded data output from the first transmission frame/packet selection unit 201, it is not necessary to add a frame/packet identification number by the first error detection code added frame/packet identification number addition unit 202.

Similarly, the second error detection code added frame/packet identification number addition unit 208 is provided to add an error detection code and a frame/packet identification number to the second coded data. However, any method capable of detecting a transmission error and a packet loss of transmitted coded data by a code conversion and reception apparatus can be used.

Similarly, the third error detection code added frame/packet identification number addition unit 214 is provided to add an error detection code and a frame/packet identification number to the third coded data, but any method capable of detecting a transmission error and a packet loss of transmitted coded data by a code conversion and reception apparatus can be used.

In a further preferable practical example of the above-mentioned embodiment, the audio code conversion and transmission apparatus is connected to an Internet communications network, compresses an audio signal input using a microphone, etc. into coded data according to, for example, an MPEG-4 advanced audio coding (AAC) system, and inputs data transmitted using a real time transport protocol (RTP)/user datagram protocol (UDP)/Internet protocol (IP) protocol.

In FIG. 2, the second compression and coding unit 206 and the third compression coding unit 212 performs a compressing process using a modified discrete cosine transform (MDCT) and quantization. The third compression coding unit 212 compresses data such that the compression rate of the third coded data can be equal to or higher than the compression rate of the first coded data in the method of quantizing an MDCT coefficient using a quantization parameter larger than that of the second compression and coding unit 206 and in the method of adaptively cutting a higher order MDCT.

The decoding unit 203 performs inverse quantization and an inverse MDCT transform.

The second coded packet generation unit 207 codes a quantized MDCT coefficient, etc. output from the second compression and coding unit 206 according to the syntax prescribed by the MPEG-4AAC.

Similarly, the third coded packet generation unit 213 codes a quantized MDCT coefficient, etc. output from the third compression coding unit 212 according to the syntax prescribed by the MPEG-4 AAC.

The first error detection code added frame/packet identification number addition unit 202, the second error detection code added frame/packet identification number addition unit 208, and the third error detection code added frame/packet identification number addition unit 214 generate UDP datagram including a check-sum for detection of an error, and transmit it to a code conversion and reception apparatus connected to the Internet.

(1.C) Code Conversion and Reception Apparatus

Figure 3:
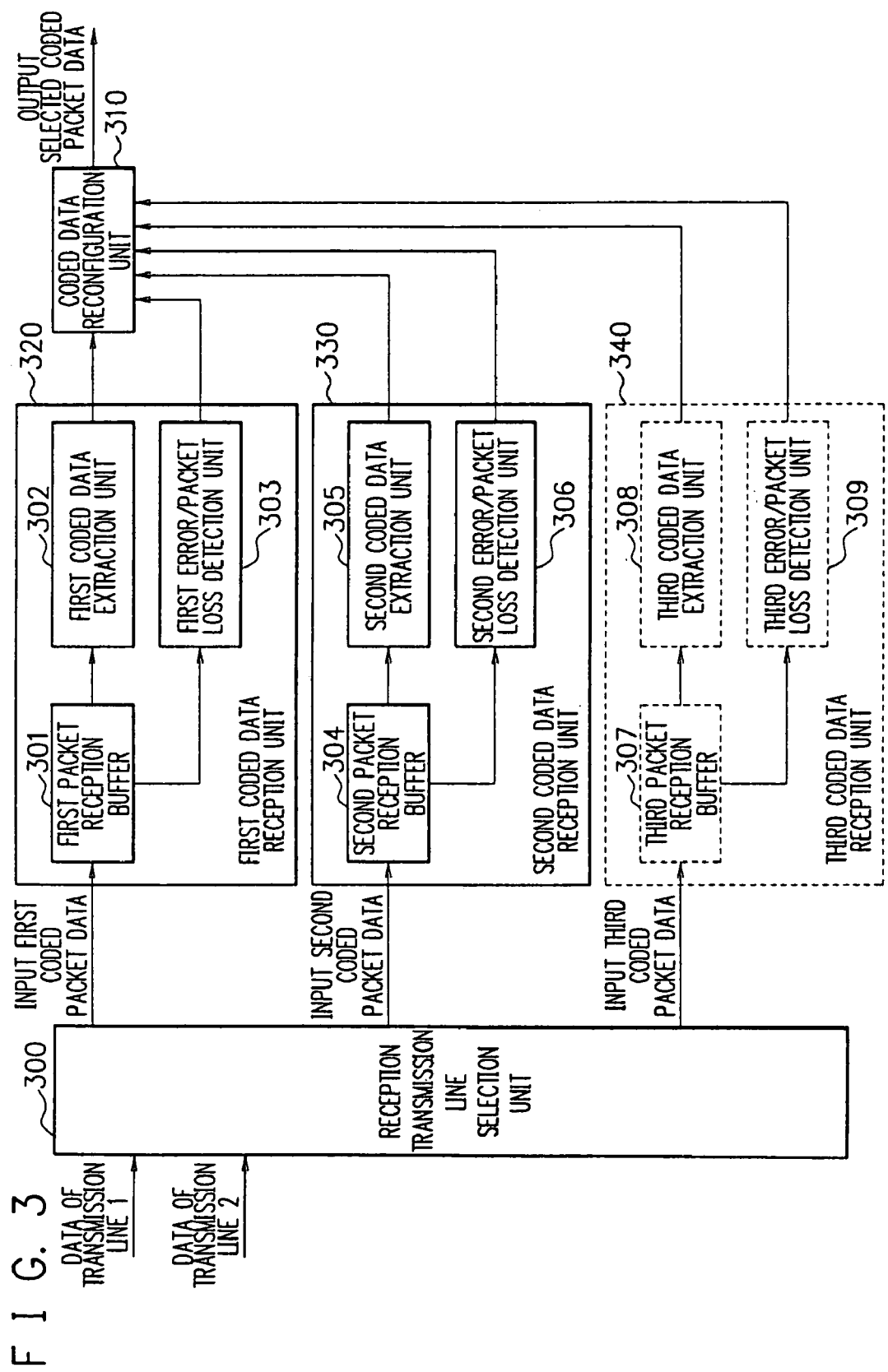
FIG. 3 shows the configuration of the code conversion and reception apparatus according to the first to seventh embodiments of the present invention.

FIG. 3 shows the detailed configuration of the code conversion and reception apparatus 120 according to the first embodiment of the present invention shown in FIG. 1. In FIG. 3, the code conversion and reception apparatus comprises a reception line selection unit 300, first to third coded data reception units 320 to 340, and a coded data reconfiguration unit 310.

The reception line selection unit 300 selects a transmission line for the code conversion and reception apparatus receiving audio data.

In the first coded data reception unit 320, a first packet reception buffer 301 receives the first coded packet data transmitted from the code conversion and transmission apparatus. A first coded data extraction unit 302 extracts audio coded data from the packet data received by the first packet reception buffer 301. A first error/packet loss detection unit 303 detects a bit error and/or a packet loss generated when the first coded packet data is transmitted.

In the second coded data reception unit 330, a second packet reception buffer 304 receives the second coded packet data transmitted from the code conversion and transmission apparatus. A second coded data extraction unit 305 extracts audio coded data from the packet data received by the second packet reception buffer 304. A second error/packet loss detection unit 306 detects a bit error and/or a packet loss generated when the second coded packet data is transmitted.

In the third coded data reception unit 340, a third packet reception buffer 307 receives the third coded packet data transmitted from the code conversion and transmission apparatus. A third coded data extraction unit 308 extracts audio coded data from the packet data received by the third packet reception buffer 307. A third error/packet loss detection unit 309 detects a bit error and/or a packet loss generated when the third coded packet data is transmitted.

A coded data reconfiguration unit 310 reconfigures two pieces of coded data transmitted from the code conversion and transmission apparatus into one piece of coded data according to the result of detecting an error and/or packet loss by the first error/packet loss detection unit 303, the second error/packet loss detection unit 306, and the third error/packet loss detection unit 309.

Figure 4:
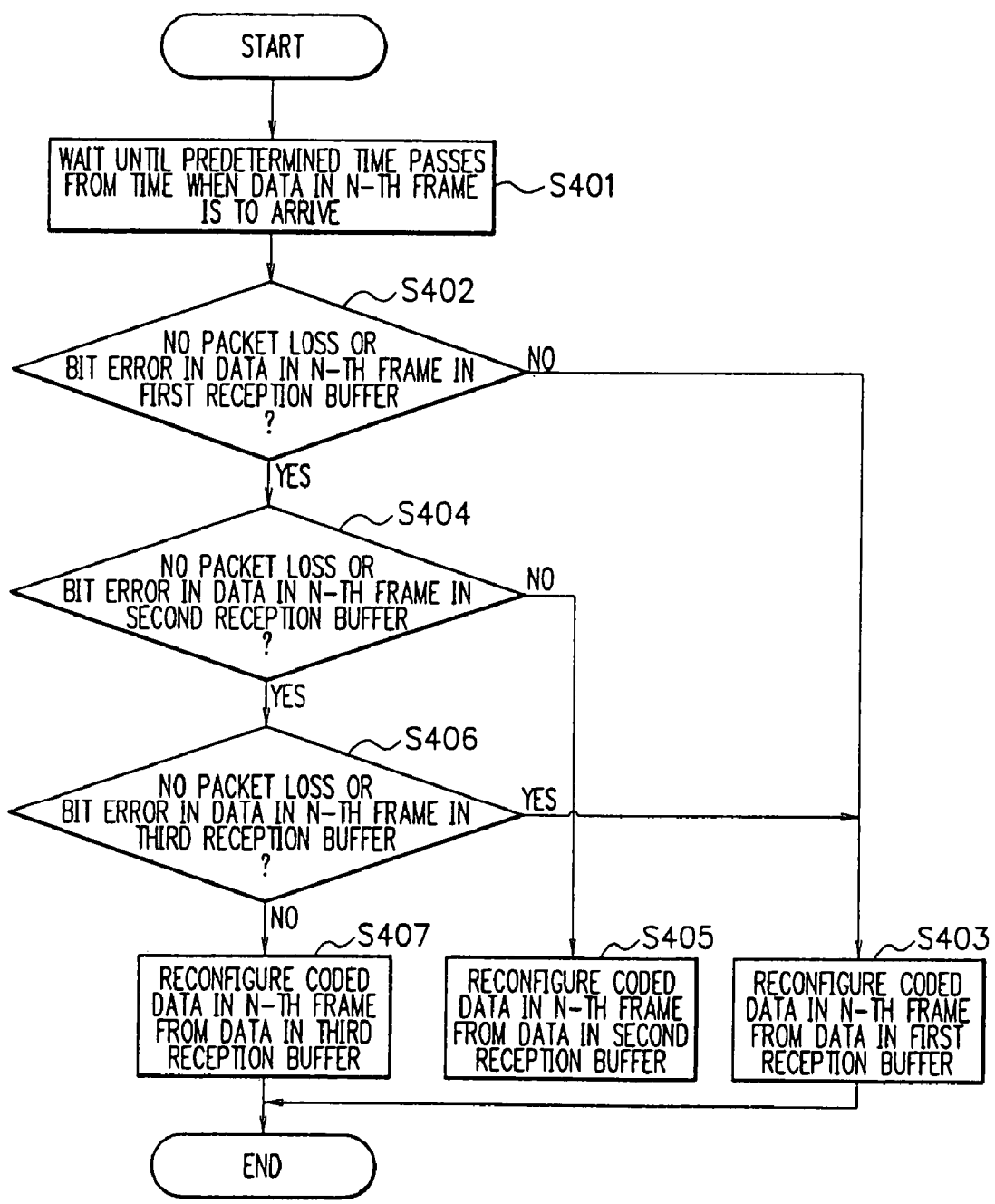
FIG. 4 shows the coded data reconfiguring procedure by the audio code conversion and reception apparatus according to the first embodiment of the present invention.

The coded data reconfiguring procedure by the coded data reconfiguration unit 310 in the present embodiment will be explained below by referring to the flowchart shown in FIG. 4. In the series of procedures shown in FIG. 4, the coded data reconfiguring process of the n-th frame is performed on a given integer n.

In step S401, control is delayed until the time obtained by adding the predetermined maximum delay time to the time when all coded data in the n-th frame should arrive at the first packet reception buffer 301 and the second packet reception buffer 304, and then control is passed to step S402.

In step S402, based on the detection result of an error and a packet loss by the first error/packet loss detection unit 303, it is determined whether or not there is any packet loss or bit error in the n-th frame data in the first packet reception buffer 301. If the first packet reception buffer 301 receives all coded data in the n-th frame, and there is no data error detected, then control is passed to step S403. Otherwise, control is passed to step S404.

When control is passed to step S403, the coded data of the n-th frame output by the first coded data extraction unit 302 is output, thereby terminating the coded data reconfiguring process.

When control is passed to step S404, it is determined whether or not there is no packet loss or bit error in the n-th frame data in the second packet reception buffer 304 based on the detection result of the error and packet loss in the second error/packet loss detection unit 306. When the second packet reception buffer 304 receives all coded data in the n-th frame and there is no data error detected, control is passed to step S405. Otherwise, control is passed to step S406.

When control is passed to step S406, it is determined whether or not there is no packet loss or bit error in the n-th frame data in the second packet reception buffer 304 based on the detection result of the error and/or packet loss in the third error/packet loss detection unit 309. When the third packet reception buffer 307 receives all coded data in the n-th frame and there is no data error detected, control is passed to step S407. Otherwise, control is passed to step S403.

In step S407, the coded data in the n-th frame output by the third coded data extraction unit 308 is output as the coded data to be decoded, thereby terminating the coded data reconfiguring process.

Described above is the coded data reconfiguring procedure by the coded data reconfiguration unit 310.

In the present embodiment, any method of detecting a transmission error and/or error packet loss in the first coded data by the first error/packet loss detection unit 303 can be used. For example, the detection can be performed using an error detection code and a frame/packet number added by the code conversion and transmission apparatus according to the present embodiment. When an error detecting function is provided for a transmission line of coded data, the detection result can also be used. When the information designating a coded frame is included in the coded data, the information included in the coded data can be used.

Similarly, any method of detecting a transmission error and/or error packet loss in the second coded data by the second error/packet loss detection unit 306 can be used.

Also, any method of detecting a transmission error and/or error packet loss by the third error/packet loss detection unit 309 can be used.

In the coded data reconfiguring procedure by the coded data reconfiguration unit 310, the method of waiting reception of the n-th frame coded data in step S401 can be replaced with any method used as long as a packet loss can be detected while suppressing the packet transmission delay within a predetermined range.

In the coded data reconfiguring procedure by the coded data reconfiguration unit 310, in step S406, when a transmission error or a packet loss is detected in the coded data received in the third reception packet buffer, that is, when a transmission error or a packet loss has occurred in all the first to third coded data, the coded data reconfiguration unit 310 can take any other countermeasures.

In the present embodiment, control is passed to step S403, and the first coded data is output as coded data to be decoded. However, for example, the output of the n-th frame can be suppressed, and the audio data in the (n−1)th frame which is output immediately before can be output as the n-th frame, etc.

In a preferred practical example of the embodiment of the present invention, the code conversion and reception apparatus is connected to an Internet communications network, receives packet data transmitted using an RTP/UDP/IP protocol from the code conversion and transmission apparatus connected to the Internet communications network at another point, converts the audio coded data contained in the received UDP datagram, and outputs the result to a decoder. The audio coded data is in accordance with the MPEG-4 AAC system. The first error/packet loss detection unit 303, the second error/packet loss detection unit 306, and the third error/packet loss detection unit 309 can detect a transmission error by calculating the checksum included in the UDP datagram.

Furthermore, since the code conversion and reception apparatus only has to decode at least one piece of data in the three pieces of received coded data, the necessary arithmetic complexity does not greatly increase as compared with the normal audio coding apparatus.

(1.D) Transmission Mode of Coded Packet Data

Figure 5:
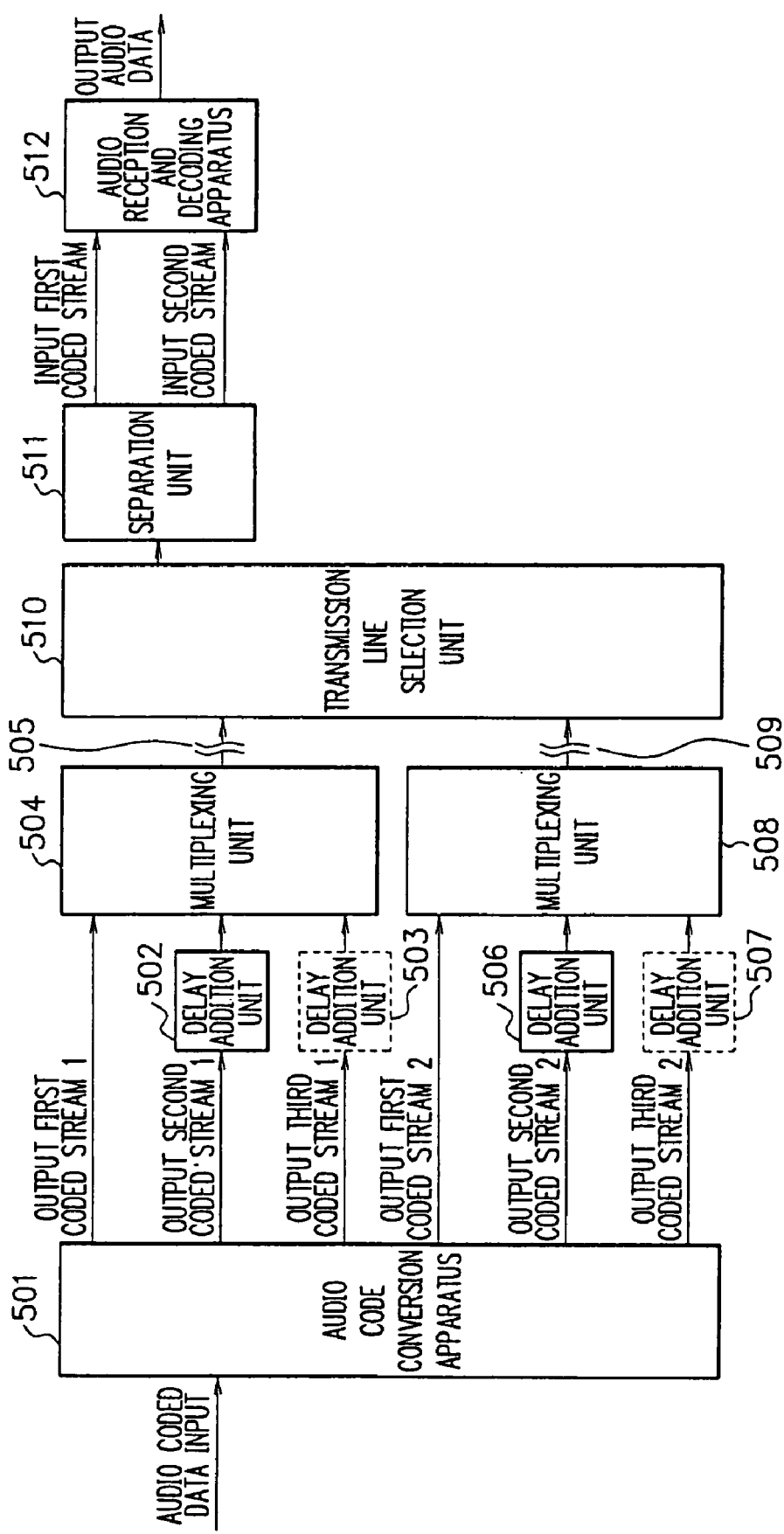
FIG. 5 shows an example of transmitting an audio coded data packet according to the first to seventh embodiments of the present invention.

According to the present invention, the first to second coded packet data can be transmitted in any method from the code conversion and transmission apparatus to the code conversion and reception apparatus. However, to enhance the effect of the present invention, a method in which the relation between a bit error and a packet loss occurring in the first coded packet data and a bit error and a packet loss occurring in the second coded packet data obtained by coding the same frame can be minimized is preferable. FIG. 5 shows a preferable mode of transmitting coded packet data.

In FIG. 5, the reference numeral 501 denotes an audio code conversion apparatus which has been explained by referring to FIGS. 1 and 2. Delay addition units 502 and 503 add predetermined or adaptively variable delay time to the second and third coded packet data output from the audio code conversion apparatus 501. A multiplexing unit 504 multiplexes the first coded data output from the audio code conversion apparatus 501 with the second coded data output from the delay addition unit 502 and the third coded data output from the delay addition unit 503, and transmits the result to a transmission line. A transmission line 505 transmits the data multiplexed by the delay addition unit 503 from the transmission apparatus to the reception apparatus. Similarly, a multiplexing unit 508 and a transmission line 509 transmit the data to the second transmission line.

In the delay addition units 502 and 503, the delay time added to the second and third coded data depends on the maximum burst time of a bit error and a packet loss occurring in the transmission line 505. The delay amount depends on the bit rate, the buffer size, etc. taken into account. Thus, even when a burst error occurs in the transmission line 505, the probability that the first to third coded data can be affected by an influence of an error. Therefore, the outstanding degradation of sound quality due to a loss of frame coded data can be reduced. The longest burst time due to a packet loss depends on the actual measurement, etc., and the delay set by the delay addition unit is set based on the buffer size of a reception apparatus and a transfer rate (bit rate) of a transmission line.

Similarly, the delay time applied to the second to third coded data by delay addition units 506 and 507 depends on the maximum burst time of a bit error and a packet loss occurring in the transmission line 509. Thus, even if a burst error occurs in the transmission line 509, there is a small probability that the first to third coded data obtained by coding data in the same frame have an influence of the error. Therefore, the occurrence of outstanding degradation in audio quality due to a loss of frame coded data can be suppressed. The delay addition unit, or the delay addition unit and the multiplexing unit can be provided in the audio code conversion apparatus 501.

(1.E) Advantages

According to the first embodiment, the audio code conversion and transmission apparatus converts the same audio data into N pieces (N=3 in this example) of coded data, and transmits the resultant data at predetermined or adaptively variable time intervals. The first audio code conversion and transmission unit outputs input audio data frame by adaptively selecting depending on the characteristic of audio data or according to a predetermined rule. The second audio code conversion and transmission unit decodes input audio data, and outputs the decoded data by coding the data at a compression rate equal to or higher than the rate of the input data. The third audio code conversion and transmission unit codes a frame coded by the second audio code conversion and transmission unit.

The code conversion and reception apparatus receives data from at least one transmission line in the M units of transmission lines, selects coded data having a low compression rate and high audio quality frame by frame from the correctly received coded data, and outputs the selected data.

As a result, even when a less reliable transmission line in which high burst transmission error and packet loss frequently occur is used, the probability that N pieces of coded data are transmitted with errors can be reduced, and the outstanding degradation can be prevented from being generated in decoded audio quality after transmission.

Furthermore, by enhancing the compression rate of the second to third coded data, the increase of transmission bands during the transmission of coded data can be suppressed.

Additionally, depending on the available band, the first to third coded data can be transmitted to a plurality of transmission lines having different bands, and the influence of an error in the transmission line can be reduced.

According to the present embodiment, the code conversion and transmission apparatus and the code conversion and reception apparatus are combined, but they can be independently used. The order of the packets of the first to N-th code converted data can be shuffled for multiplexing by an interleave method or the like.

[Second Mode for Carrying Out the Present Invention]

In the second embodiment of the present invention, the code conversion and transmission apparatus includes for an integer N of 2 or larger and an integer M of 1 or larger: a) first audio code conversion and transmission means for inputting compressed coded packet data, and transmitting all packets or a part of packets adaptively selected depending on the characteristics of input audio data or according to a predetermined rule using predetermined transmission means; b) (N−1) units of the second to N-th audio code conversion and transmission means for decoding input coded packet data, compressing and coding data into packet data at a compression rate equal to or higher than the rate of the first audio code conversion and transmission means, and transmitting all obtained packet data or a part of packet data adaptively selected depending on the characteristic of input audio data or according to a predetermined rule at predetermined or adaptively variable time intervals using transmission means the same as or different from the transmission means of the first audio code conversion and transmission means; and c) means for selecting a compression rate for coding of at least one of the first to N-th audio code conversion and transmission means, and transmitting it to the first to M-th transmission lines.

The code conversion and reception apparatus includes d) selection means for selecting at least one transmission line from M transmission lines, receiving up to N pieces of coded data from the selected transmission line, selecting coded packet data having the lowest compression rate from the packet data received without a transmission error or a loss, and outputting the selected data. The process and function of each means of the code conversion and transmission apparatus and the code conversion and reception apparatus can be realized by a program executed by a computer configuring the code conversion and transmission apparatus and the code conversion and reception apparatus.

Second Embodiment

For detailed explanation about the second mode for carrying out the present invention, the second embodiment of the present invention will be explained below.

(2.A) Summary

The configuration and the operation of the present embodiment is substantially the same as those of the first embodiment. As shown in FIG. 1, the embodiment of the present invention comprises the code conversion and transmission apparatus 100, the code conversion and reception apparatus 120, and the transmission lines 130 for transmitting coded data. The integer N indicates the number of coded data transmitted by the code conversion and transmission apparatus, and is 2 or larger. The integer M indicates the number of transmission lines for transmitting N pieces of coded data, and is 1 or larger.

The configuration of the code conversion and transmission apparatus 100 is substantially the same as that according to the first invention, but the operation of each unit forming the apparatus is somewhat different. Described below are the differences.

The audio coded data in the input frame coded by the first audio code conversion and transmission unit (first audio coded frame 1 transmission unit) 102 is configured by one or more pieces of packet data, and each piece of packet coded data is coded compressed data. The first audio stream transmits all or a part of packets of input audio data to the code conversion and reception apparatus 120.

The second audio code conversion and transmission unit (second audio coded frame 1 transmission unit) 104 decodes input audio data, compresses and codes the obtained audio data at a compression rate equal to or higher than the rate of the first audio stream, and transmits the coded data to the code conversion and reception apparatus 120.

The third to N-th audio code conversion and transmission units 105 and 106 code all or a part of packets coded by the second audio code conversion and transmission unit at a compression rate equal to or higher than the rate of the second audio code conversion and transmission unit, and transmits the obtained coded packet data to the code conversion and reception apparatus 120. The operations other than the above-mentioned operation are basically the same as those in the first embodiment. In the second embodiment, depending on the band available in the transmission of audio data in each transmission line 130, the compression rate of the second to N-th audio code conversion and transmission units 104 to 106 can be selected. The output of the first to N-th audio code conversion and transmission units 102, 104 to 106 is output to the first to M-th transmission lines 130. In the present embodiment, data can be transmitted based on the status of the transmission line or the intention of the transmitter of audio data.

The configuration of the code conversion and reception apparatus 120 is substantially the same as the first embodiment, but the operation of each unit configuring the apparatus is somewhat different. Described below are the differences.

The coded data reconfiguration unit 112 selects a packet having the lowest compression rate from among up to N pieces of coded packet data including the compressed data in the same area of the same frame received without a transmission error or a loss by the first to N-th coded data reception unit as in the first embodiment. The data is selected in a packet unit transmitted by the code conversion and transmission apparatus. The operations other than the above-mentioned operation are basically the same as those in the first embodiment.

(2.B) Code Conversion and Transmission Apparatus

The operation and the configuration of the code conversion and transmission apparatus according to the present invention are substantially the same as those of the code conversion and transmission apparatus according to the first embodiment shown in FIG. 2. Only the operations of the first coded packet selection unit 201, the second coded packet generation unit 207, the third coded packet generation unit 213, the first error detection code added frame/packet identification number addition unit 202, the second error detection code added frame/packet identification number addition unit 208, and the third error detection code added frame/packet identification number addition unit 214 are different. Described below are the differences.

The first error detection code added frame/packet identification number addition unit 202, the second error detection code added frame/packet identification number addition unit 208, and the third error detection code added frame/packet identification number addition unit 214 operate such that the same packet identification number can be assigned to the coded packet data in the same frame. The operations of the processing units other than the above-mentioned operation are the same as those in the first embodiment.

(2.C) Code Conversion and Reception Apparatus

The configuration and the operations of the audio code conversion and reception apparatus according to the present embodiment are substantially the same as those of the audio code conversion and reception apparatus according to the first embodiment, and only the operations of the coded data reconfiguration unit 310 shown in FIG. 3 are different. Described below are the differences.

Figure 6:
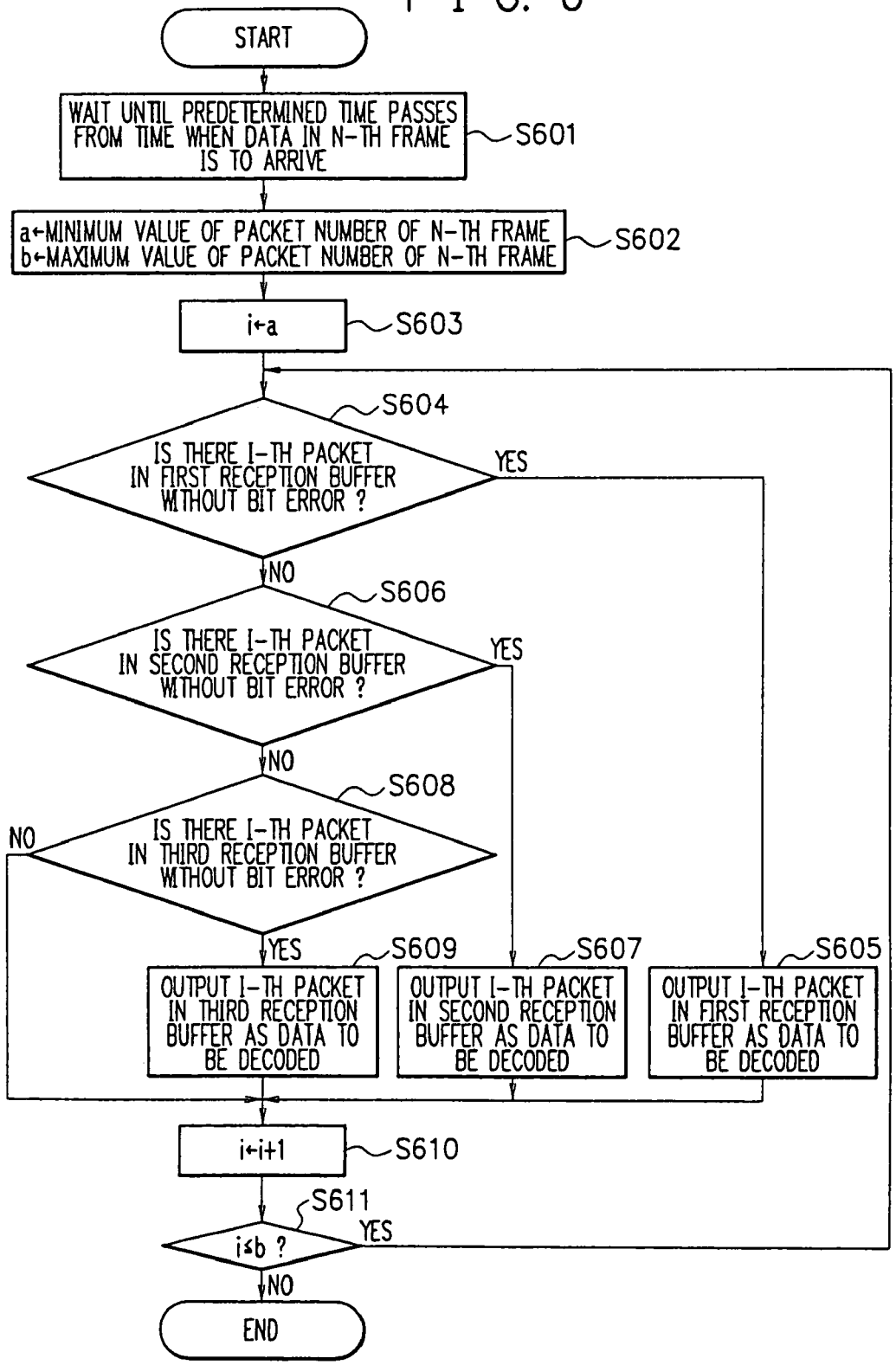
FIG. 6 shows the coded data reconfiguring procedure by the audio code conversion and reception apparatus according to the second embodiment of the present invention.

The coded data reconfiguring procedure by the coded data reconfiguration unit 310 in the present embodiment will be explained below by referring to the flowchart shown in FIG. 6. In the series of procedures shown in FIG. 6, the coded data reconfiguring process of the n-th frame is performed on a given integer n.

In step S601, control is delayed until the time obtained by adding the predetermined maximum delay time to the time when all coded data in the n-th frame should arrive at the first packet reception buffer 301, the second packet reception buffer 304, and the third packet reception buffer 307, and then control is passed to step S602.

In step S 602, a variable for storage of a packet number stores the minimum value of the packet number of the n-th frame, and a variable b stores the maximum value of the packet number of the n-th frame.

In step S603, the value of the variable is substituted for the variable i for storage of a packet number, and the repeating process is started from step S604.

In step S604, it is determined according to the detection result of an error and a packet loss in the first error/packet loss detection unit 303 whether or not an i-th packet exists and there are bit errors in the first packet reception buffer 301. When the i-th packet in the n-th frame is received in the first packet reception buffer 301, and there are no errors in the data, control is passed to step S605. Otherwise, control is passed to step S606.

When control is passed to step S605, the coded data in the n-th frame output by the first coded data extraction unit 302 is output as the coded data to be decoded, and control is passed to step S610.

When control is passed to step S606, it is determined according to a detection result of an error and a packet loss by the second error/packet loss detection unit 306 whether or not there is the i-th packet and there are bit errors in the second packet reception buffer 304. When the second packet reception buffer 304 receives the i-th packet in the n-th frame, and there are no data errors detected, control is passed to step S607. Otherwise, control is passed to step S608.

In step S607, the coded data in the n-th frame output by the second coded data extraction unit 305 is output as coded data to be decoded, and control is passed to step S610.

When control is passed to step S608, it is determined according to a detection result of an error and a packet loss by the third error/packet loss detection unit 309 whether or not there is the i-th packet and there are bit errors in the third packet reception buffer 307. When the third packet reception buffer 307 receives the i-th packet in the n-th frame, and there are no data errors detected, control is passed to step S609. Otherwise, control is passed to step S610.

In step S610, the variable i is incremented by 1. In step S611, it is determined whether or not the variable i exceeds the value of the variable b. If it does not exceed, the processes from step S604 are repeated.

In step S610, when the variable i exceeds the variable b, a series of repeated processes are performed, thereby terminating the n-th frame coded data reconfiguring process.

The operations of the coded data reconfiguration unit 310 according to the present embodiment have been described above. The method of waiting for the reception of the n-th frame coded data at step S601 in the coded data reconfiguring procedure by the coded data reconfiguration unit 310 according to the present embodiment can be replaced by any method of detecting a packet loss with the transmission delay being maintained in a predetermined range.

(2.D) Advantages

According to the second embodiment, the audio code conversion and transmission apparatus codes the same audio data into N pieces (N=3 in this example) of coded data, and transmits the resultant data at predetermined or adaptively variable time intervals.

The second to third audio code conversion and transmission means codes an area including a packet converted by the first audio code conversion and transmission means.

The code conversion and reception apparatus selects the coded data having a low compression rate and high audio quality from the correctly received coded data in a packet unit and then decodes the data.

As a result, even when a less reliable transmission line in which high burst transmission error and packet loss frequently occur is used, the probability that 3 pieces of coded data are transmitted with errors can be reduced, and the outstanding degradation can be prevented from being generated in decoded audio quality after transmission.

Furthermore, by enhancing the compression rate of the second to third coded data, the increase of transmission bands during the transmission of coded data can be suppressed.

Additionally, depending on the available band, the first to third coded data can be transmitted to a plurality of transmission line having different bands, and the influence of an error in the transmission line can be reduced. Since the code conversion and reception apparatus only has to decode one of the three received coded data, the arithmetic complexity is not greatly increased as compared with the common audio decoding apparatus.

According to the present embodiment, the code conversion and transmission apparatus and the code conversion and reception apparatus are combined, but they can be independently used.

[Third Mode for Carrying Out the Present Invention]

In the third embodiment of the present invention, the code conversion and transmission apparatus includes, for an integer N of 2 or larger and an integer M of 1 or larger: a) first audio code conversion and transmission means for inputting compressed coded data, compressing and coding all frames of decoded audio data or a part of frames selected depending on the characteristic of input audio data or according to a predetermined rule at a compression rate equal to or higher than the rate of the input audio data, and transmitting obtained coded data using predetermined transmission means; b) (N−1) units of the second to N-th audio code conversion and transmission means for coding all frames coded by the first audio code conversion and transmission means or a part of frames adaptively selected depending on the characteristic of input audio data or according to a predetermined rule at a compression rate equal to or higher than the rate of the first audio code conversion and transmission means, and transmitting obtained coded data at predetermined or adaptively variable time intervals using transmission means the same as or different from the transmission means of the first audio code conversion and transmission means; and c) means for selecting a compression rate for coding for the first to N-th audio code conversion and transmission means depending on the band available for each of the first to M-th transmission lines, and transmitting it to the first to M-th transmission lines.

The code conversion and reception apparatus includes d) means for selecting at least one transmission line from M transmission lines, receiving N pieces of coded data from the selected transmission line, extracting coded data received without a transmission error or a loss, selecting audio coded data having the lowest compression rate from the coded data in the same frame, and outputting the selected data. The process and function of each means of the code conversion and transmission apparatus and the code conversion and reception apparatus can be realized by a program executed by a computer configuring the code conversion and transmission apparatus and the code conversion and reception apparatus.

Third Embodiment

For detailed explanation about the third mode for carrying out the present invention, the third embodiment of the present invention will be explained referring to the drawings.

(3.A) Summary

Figure 7:
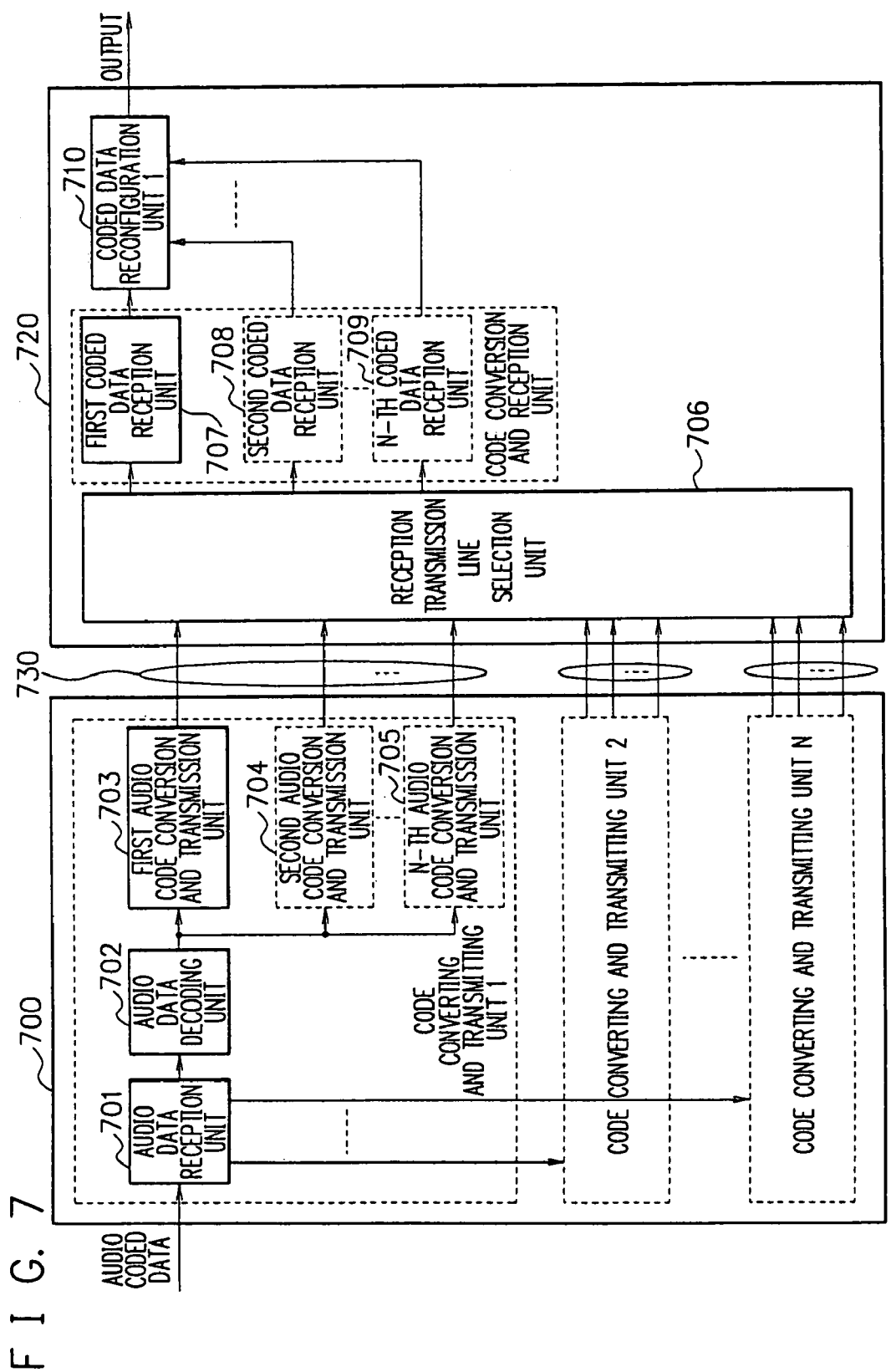
FIG. 7 shows the configuration of the audio data transmission system according to the third embodiment of the present invention.

FIG. 7 shows the configuration of the third embodiment of the present invention. As shown in FIG. 7, the embodiment of the present invention comprises a code conversion and transmission apparatus for audio data (also referred to as an "audio code conversion and transmission apparatus") 700, a code conversion and reception apparatus (also referred to as an "audio code conversion and reception apparatus") 720, and transmission lines 730 for transmitting coded data. The integer N indicates the number of coded data transmitted by the code conversion and transmission apparatus 700, and is assumed to be 2 or larger. The integer M indicates the number of transmission lines by which N pieces of coded data are transmitted, and is assumed to be 1 or larger.

The audio code conversion and transmission apparatus 700 decodes input audio coded data, compresses and codes the obtained audio data at a compression rate equal to or higher than the rate of the input data, and transmits code converted data to the audio code conversion and reception apparatus 720. The input audio data is coded into N pieces of coded data, and transmitted as the first to N-th audio coded data to the first to M-th transmission lines. As shown in FIG. 7, the apparatus comprises code converting units 1 to N, and each code converting unit comprises N units of first to N-th audio code conversion and transmission units (first to N-th audio code conversion and transmission units) 703, 704, and 705.

An audio data reception unit 701 receives audio data.

An audio data decoding unit 702 decodes input audio coded data.

The first audio code conversion and transmission unit 703 compresses and codes in a predetermined method on a frame input to the code conversion and transmission apparatus, and the obtained coded data is transmitted to the audio code conversion and reception apparatus 720.

The second to N-th audio code conversion and transmission units 704 and 705 code all or a part of frames coded by the first audio code conversion and transmission unit 703 at a compression rate equal to or higher than the rate of the first audio code conversion and transmission unit 703, and transmit the obtained coded data to the audio code conversion and reception apparatus 720. The first to N-th audio streams are transmitted to the first to M-th transmission lines 730. Each transmission line 730 can control by selecting the compression rate for coding of the first to N-th audio code conversion and transmission units 703 to 705 depending on the available bands for transmission of audio data. The output of the first to N-th audio code conversion and transmission units 703 to 705, whose compression rate in coding is controlled, is output to the first to M-th transmission lines 730, and data can be transmitted based on the status of the transmission line or the intention of the transmitter of audio data.

In the audio code conversion and reception apparatus 720, a reception transmission line selection unit 706 selects at least one transmission line from the M transmission lines transmitted by the audio code conversion and transmission apparatus, receives N pieces of coded data from the selected transmission lines, and then decodes the data.

As shown in FIG. 7, the audio code conversion and reception apparatus 720 comprises first to N-th coded data reception units 707 to 709 for receiving the coded data transmitted from the first to N-th audio coded frame 1 transmission units 703 to 705 provided in the code conversion and transmission apparatus 700, and the coded data reconfiguration unit 710.

The coded data reconfiguration unit 710 selects the data having the lowest compression rate from among up to N pieces of coded data received without a transmission error or a loss by the coded data reception unit 707 to 709, and outputs the selected data.

Figure 8:
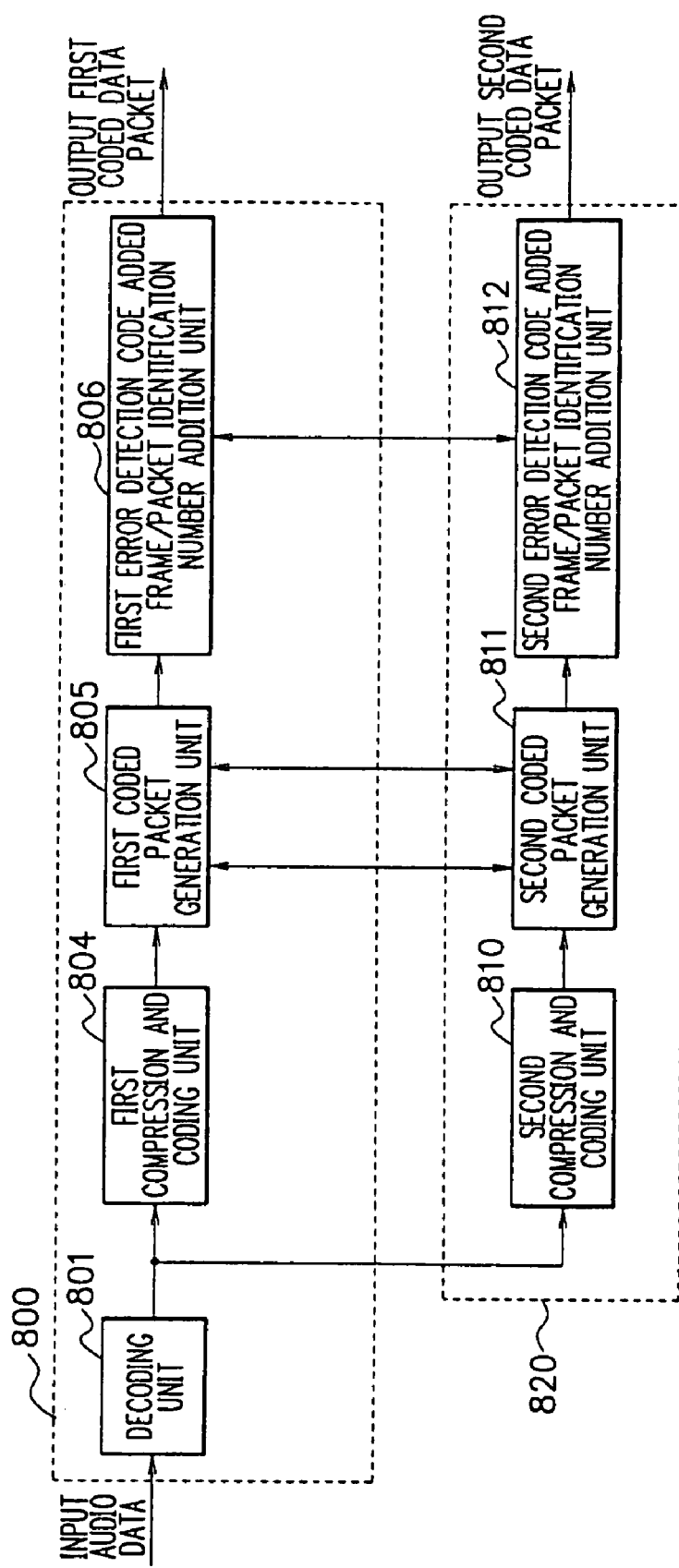
FIG. 8 shows the configuration of the audio code conversion and transmission apparatus according to the third embodiment of the present invention.

(3.B) Code Conversion and Transmission Apparatus:

FIG. 8 shows the detailed configuration of the audio code conversion and transmission apparatus according to the third embodiment of the present invention. For simplicity, the number N of the coded data to be output by the apparatus is assumed to be 2, and the number M of the transmission lines for transmitting the coded data is assumed to be 2. The apparatus corresponds to the configuration including the first audio code conversion and transmission unit 703 and the second audio code conversion and transmission unit 704 shown in FIG. 7.

In FIG. 8, a first audio coded conversion and transmission unit 800 comprises: a decoding unit 801 for decoding input audio data; a first compression and coding unit 804 for compressing and coding the data; a first coded packet generation unit 805 for coding the compressed data obtained by the first compression and coding unit 804 into a variable length bit string, and outputting the result in a predetermined packet unit; and a first error detection code frame/packet identification number addition unit 806 for adding an error detection code and a frame/packet identification number for detecting a transmission error and a packet loss of the coded packet data output by the first coded packet generation unit 805 by the reception apparatus. The first audio coded data packet is transmitted by predetermined transmission means in a packet unit.

In FIG. 8, a second audio coded conversion and transmission unit 820 (corresponding to the second audio code conversion and transmission unit 704) comprises a second compression and coding unit 810 for coding data at a compression rate equal to or higher than the rate of the first compression and coding unit 804; a second coded packet generation unit 811 for coding compressed data obtained by the second compression and coding unit 810 into a variable length bit string, and outputting the result in a predetermined packet unit; and a second error detection code added frame/packet identification number addition unit 812 for adding an error detection code and a frame/packet identification number for detecting by the receiving apparatus a transmission error and a packet loss of the compressed packet data output by the second coded packet generation unit 811. The second audio coded data packet is transmitted by a predetermined transmission means in a packet unit.

In the present embodiment, M and N are assumed to be 2. Therefore, the first and second audio code conversion and transmission data packets are transmitted to the two transmission lines.

In the present embodiment, the first error detection code added frame/packet identification number addition unit 806 adds an error detection code and a frame/packet identification number to the first coded packet data output from the first coded packet generation unit 805. However, any method can be applied so far as a transmission error and a packet loss of the transmitted coded packet data can be detected by the code conversion and reception apparatus. For example, when there is a mechanism of detecting a transmission error in the transmission line of the first coded packet, it is not necessary for the first error detection code frame/packet identification number addition unit 806 to add an error detection code. For another example, if there is information for identification of a frame and a packet in the coded data output from the first coded packet generation unit 805, it is not necessary to add a frame/packet identification number by the first error detection code frame/packet identification number addition unit 806.

Similarly, the second error detection code added frame/packet identification number addition unit 812 adds an error detection code and a frame/packet identification number to the second coded packet data. However, any other methods can be applied so far as a transmission error and a packet loss of the transmitted coded packet data can be detected by the code conversion and reception apparatus.

An example of more preferably embodying the above-mentioned present embodiment is the same as that according to the first embodiment of the present invention.

(3.C) Code Conversion and Reception Apparatus

The audio code conversion and reception apparatus (720 shown in FIG. 7) according to the third embodiment of the present invention has the same configuration as shown in FIG. 3. In FIG. 3, the number M of the transmission lines is 3, but M=2 in the present embodiment. Therefore, there is no third coded data reception unit 340 (refer to FIG. 3) of the code conversion and reception apparatus in the present embodiment. Furthermore, since M is 2, the procedure of the operation of the coded data reconfiguration unit 310 is different from that shown in FIG. 3.

Figure 9:
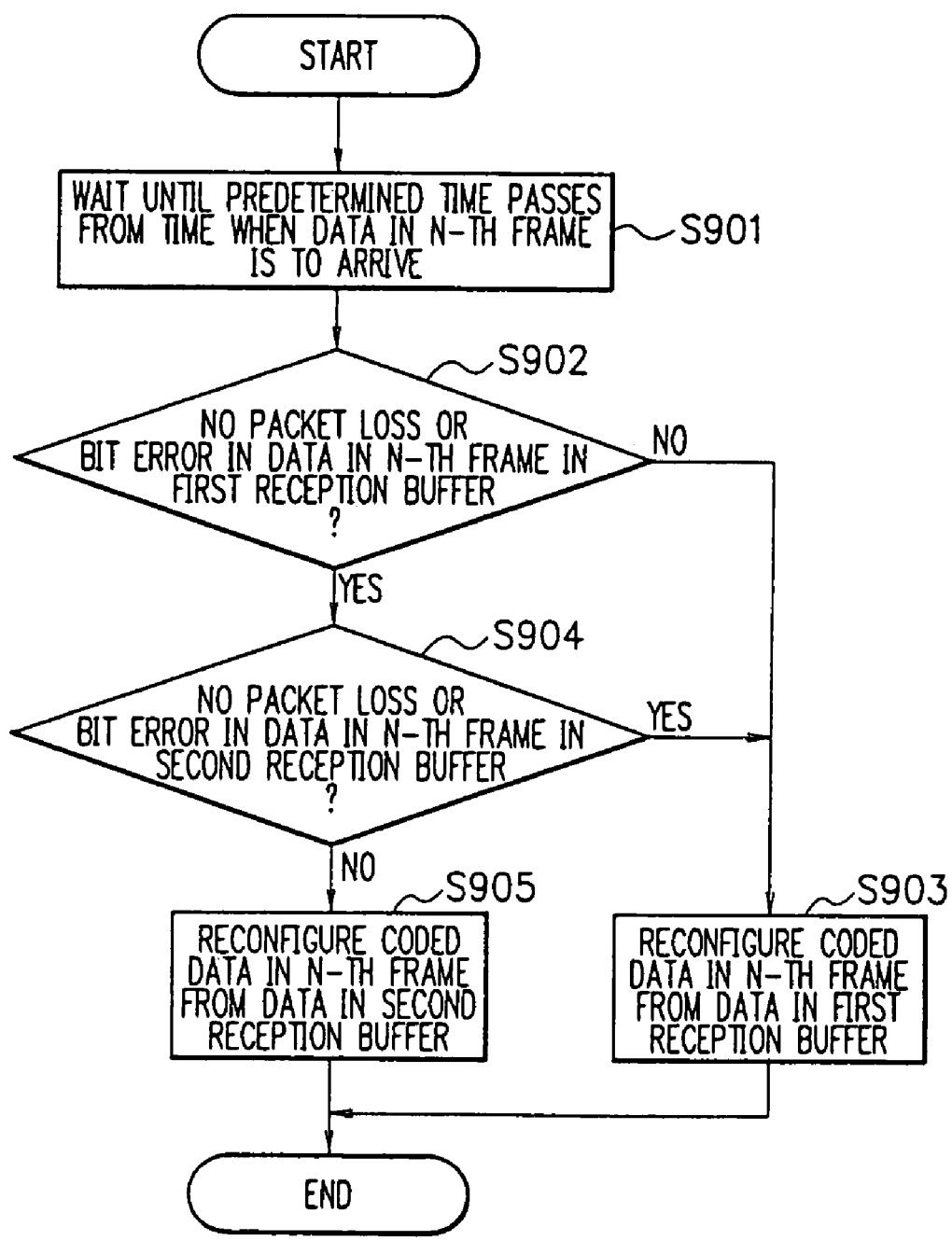
FIG. 9 shows the coded data reconfiguring procedure by the audio code conversion and reception apparatus according to the third embodiment of the present invention.

The operation procedure by the coded data reconfiguration unit 310 in the present embodiment will be explained below by referring to the flowchart shown in FIG. 9. In the series of procedures shown in FIG. 9, the coded data reconfiguring process of the n-th frame is performed on a given integer n.

In step S901, control is delayed until the time obtained by adding the predetermined maximum delay time to the time when all coded data in the n-th frame should arrive at the first packet reception buffer 301 and the second packet reception buffer 304 (refer to FIG. 3), and then control is passed to step S902.

In step S902, based on the detection result of an error and a packet loss by the first error/packet loss detection unit 303, it is determined whether or not there is any packet loss or bit error in the n-th frame data in the first packet reception buffer 301. If the first packet reception buffer 301 receives all coded data in the n-th frame, and there is no data error detected, then control is passed to step S903. Otherwise, control is passed to step S904.

When control is passed to step S903, the coded data of the n-th frame output by the first coded data extraction unit 302 is passed to the variable length decoding unit (not shown in FIG. 3; for example, corresponding to the decoding apparatus shown in FIG. 15) as coded data to be decoded, thereby terminating the coded data reconfiguring process.

When control is passed to step S904, it is determined whether or not there is no packet loss or bit error in the n-th frame data in the second packet reception buffer 304 based on the detection result of the error and packet loss in the second error/packet loss detection unit 306. When the second packet reception buffer 304 receives all coded data in the n-th frame and there is no data error detected, control is passed to step S905. Otherwise, control is passed to step S903.

In step S905, the coded data of n-th frame output by the second coded data extraction unit 305 is passed to the variable length decoding unit (not shown in FIG. 3; for example, corresponding to the decoding apparatus shown in FIG. 15) as the coded data to be decoded, thereby terminating the coded data reconfiguring process.

The operations of other units according to the present embodiment and a preferable example are the same as those according to the first embodiment.

(3.D) Advantages

According to the above-mentioned third embodiment, the audio code conversion and transmission apparatus decodes the input audio data, codes the same audio data into two pieces of coded data, and transmits them at predetermined or adaptively variable time intervals.

The second audio code conversion and transmission means codes a coded frame coded by the first audio coded transmission means.

The code conversion and reception apparatus selects coded data having a low compression rate and high audio quality from the correctly received coded data in a frame unit, and outputs the selected data. As a result, even when a less reliable transmission line in which high burst transmission error and packet loss frequently occur is used, the probability that two pieces of coded data are transmitted with errors can be reduced, and the outstanding degradation can be prevented from being generated in decoded audio quality after transmission.

Furthermore, by enhancing the compression rate of the second coded data, the increase of transmission bands during the transmission of second coded data can be suppressed. Additionally, depending on the status of a transmission line and the intention of an audio transmitter or an audio receiver, the first to second coded data can be transmitted to a plurality of transmission lines having different bands, and the influence of an error in the transmission line can be reduced.

Additionally, the code conversion and reception apparatus can decode at least one piece of data from the two pieces of received coded data, thereby suppressing the increase of necessary arithmetic complexity as compared with the common audio decoding apparatus.

According to the present embodiment, the code conversion and transmission apparatus and the code conversion and reception apparatus are combined, but they can be independently used. The first to N-th code converted data can be arranged using interleaving.

[Fourth Mode for Carrying Out the Present Invention]

In the fourth embodiment of the present invention, the code conversion and transmission apparatus includes for an integer N of 2 or larger and an integer M of 1 or larger: a) first audio code conversion and transmission means for decoding input coded packet data, compressing and coding the data at a compression rate equal to or higher than the rate of the input audio data, and transmitting the obtained one or more pieces of coded packet data using predetermined transmission means; b) (N−1) units of the second to N-th audio code conversion and transmission means for coding all packet data coded by the first audio code conversion and transmission means or a part of packet data adaptively selected depending on the characteristic of input audio data or according to a predetermined rule into packet data including the same area as the packet data at a compression rate equal to or higher than the rate of the first audio code conversion and transmission means, and transmitting the obtained coded packet data at predetermined or adaptively variable time intervals using transmission means the same as or different from the transmission means of the first audio code conversion and transmission means; and c) means for selecting a compression rate of the first to N-th audio code conversion and transmission means depending on the band available for the first to M-th transmission line, and transmitting it to the first to M-th transmission lines.

The code conversion and reception apparatus includes d) selection means for selecting at least one transmission line from M transmission lines, receiving N pieces of coded data from the selected transmission line, selecting coded packet data which has the lowest compression rate from the packet data of the same frame received without a transmission error or a loss, and outputting the selected data. The process and function of each means of the above-mentioned code conversion and transmission apparatus and code conversion and reception apparatus can be realized by the program executed by the computer configuring the above-mentioned code conversion and transmission apparatus and code conversion and reception apparatus.

Fourth Embodiment

For detailed explanation about the fourth mode for carrying out the present invention, the fourth embodiment of the present invention will be explained referring to the drawings.

(4.A) Summary

The configuration and the operation of the present embodiment are substantially the same as those according to the third embodiment, and comprises the audio code conversion and transmission apparatus 700, the code conversion and reception apparatus 720, and the transmission lines 730 for transmitting coded data as shown in FIG. 7. The integer N indicates the number of pieces of coded data transmitted by the code conversion and transmission apparatus, and is 2 or larger. The integer M indicates the number of the transmission lines for transmitting N pieces of coded data, and is 1 or larger.

The configuration of the audio code conversion and transmission apparatus is substantially the same as that according to the third embodiment, but the operation of each unit forming the apparatus is somewhat different. The apparatus decodes input audio coded data, compresses and codes the obtained audio data at a compression rate equal to or higher than the rate of the input audio data, and transmits code converted data to the audio code conversion and reception apparatus. The coded data of the input frame coded by the first audio code conversion and transmission unit 703 is configured by one or more pieces of packet data. The second to N-th audio code conversion and transmission unit 704 to 705 code all or a part of packets coded by the first audio code conversion and transmission unit 703 at a compression rate equal to or higher than the rate of the first audio code conversion and transmission unit 703, and transmits the obtained coded packet data to the audio code conversion and reception apparatus. The operations other than those described above are basically the same as those according to the third embodiment.

The configuration of the audio code conversion and reception apparatus is substantially the same as that according to the third embodiment, but the operation of each unit forming the apparatus is somewhat different. The differences will be described below. The coded data reconfiguration unit 710 selects a packet having the lowest compression rate as the coded data to be decoded from among up to N pieces of coded packet data including the compressed data in the same area of the same frame and received without a transmission error or a packet loss by the first to N-th coded data reception units 707, 708, and 709 as in the third embodiment. The selection is performed on each packet data transmitted by the code conversion and transmission apparatus. The operations other than the above-mentioned operations are basically the same as those in the third embodiment. In the embodiment, depending on the band available in the transmission of audio data in each transmission line 730, the compression rate for coding by the first to N-th audio code conversion and transmission units 703 to 705 is selected. The output of the first to N-th audio code conversion and transmission units 703 to 705 is output to the first to M-th transmission lines 730, and data can be transmitted based on the status of the transmission line or the intention of the transmitter of audio data.

(4.B) Code Conversion and Transmission Apparatus

The configuration and operation of the audio data code conversion and transmission apparatus according to the present embodiment are substantially the same as those of the audio data code conversion and transmission apparatus according to the third embodiment shown in FIG. 8, and the operations of only the first coded packet generation unit 805, the second coded packet generation unit 811, the first error detection code added frame/packet identification number addition unit 806, and the second error detection code added frame/packet identification number addition unit 812 shown in FIG. 8 are different. Described below are the differences.

That is, in the present embodiment, the first error detection code added frame/packet identification number addition unit 806 and the second error detection code added frame/packet identification number addition unit 812 operate such that the same packet identification number can be added to the coded packet data in the same frame. The operations of the processing units other than those described above are the same as those according to the third embodiment.

A further preferred practical example of the embodiment is similar to that according to the second embodiment.

(4.C) Code Conversion and Reception Apparatus

The configuration and operation of the audio code conversion and reception apparatus according to the present embodiment is substantially the same as those of the audio code conversion and reception apparatus according to the second embodiment shown in FIG. 3. In FIG. 3, the number M of the transmission lines is 3, but M=2 in the present embodiment. Therefore, there is no third coded data reception unit in the present embodiment. Furthermore, since M is 2, the procedure of the operation of the coded data reconfiguration unit 310 is different.

Figure 10:
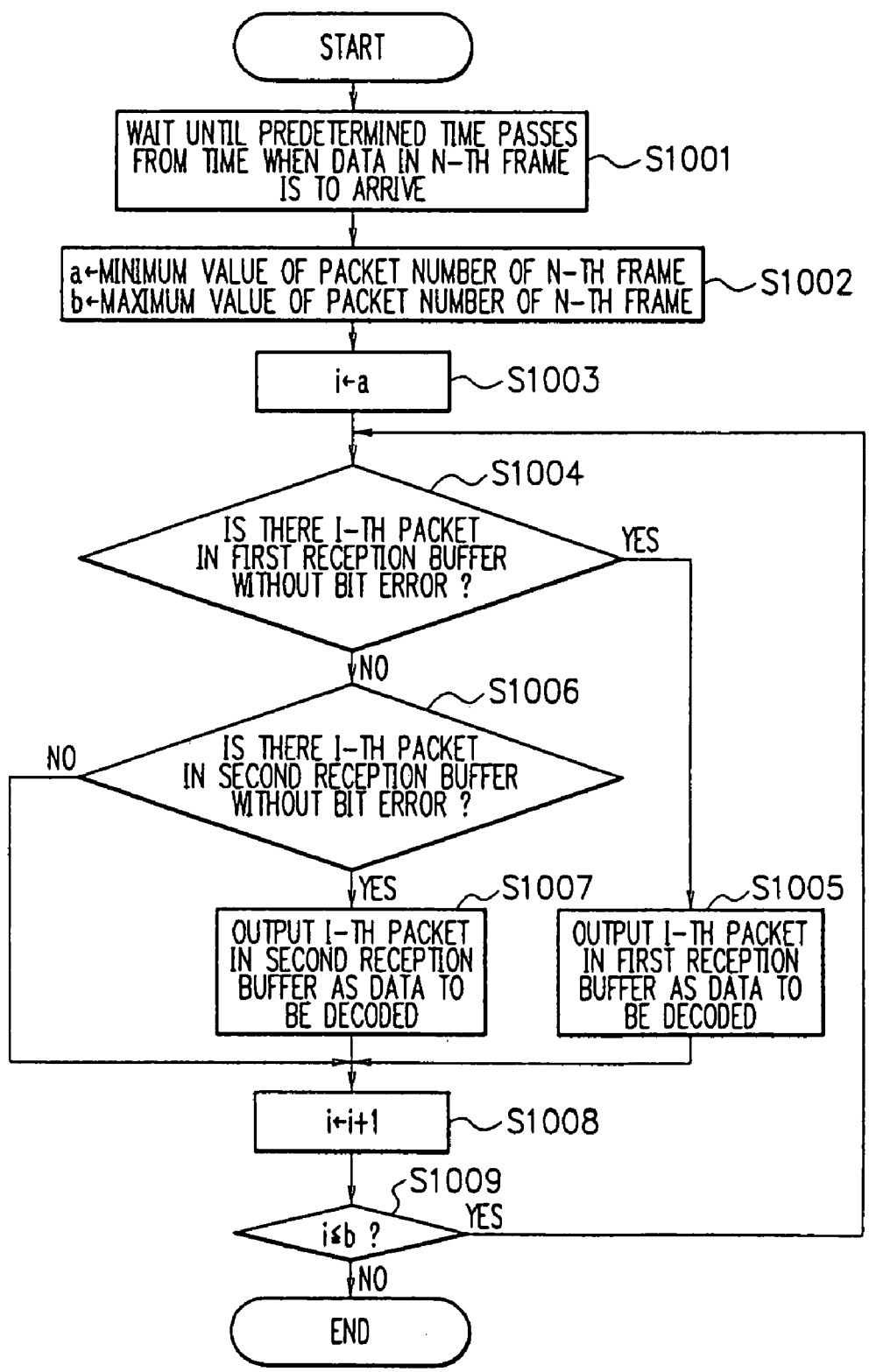
FIG. 10 shows the coded data reconfiguring procedure by the audio code conversion and reception apparatus according to the fourth embodiment of the present invention.

The operation procedure by the coded data reconfiguration unit 310 in the present embodiment will be explained below by referring to the flowchart shown in FIG. 10. In the series of procedures shown in FIG. 10, the coded data reconfiguring process of the n-th frame is performed on a given integer n.

In step S1001, control is delayed until the time obtained by adding the predetermined maximum delay time to the time when all coded data in the n-th frame should arrive at the first packet reception buffer 301 and the second packet reception buffer 304, and then control is passed to step S1002.

In step S1002, a variable a for storage of a packet number stores the minimum value of the packet number of the n-th frame, and a variable b stores the maximum value of the packet number of the n-th frame.

In step S1003, the value of the variable a is substituted for the variable i for storage of a packet number, and the repeating process is started from step S1004.

In step S1004, it is determined according to the detection result of an error and a packet loss in the first error/packet loss detection unit 303 whether or not an i-th packet of the n-th frame exists and there are bit errors in the first packet reception buffer 301. When the i-th packet in the n-th frame is received in the first packet reception buffer 301 and there are no errors in the data as a result of the determination in step S1004, control is passed to step S1005. Otherwise, control is passed to step S1006.

Figure 15:
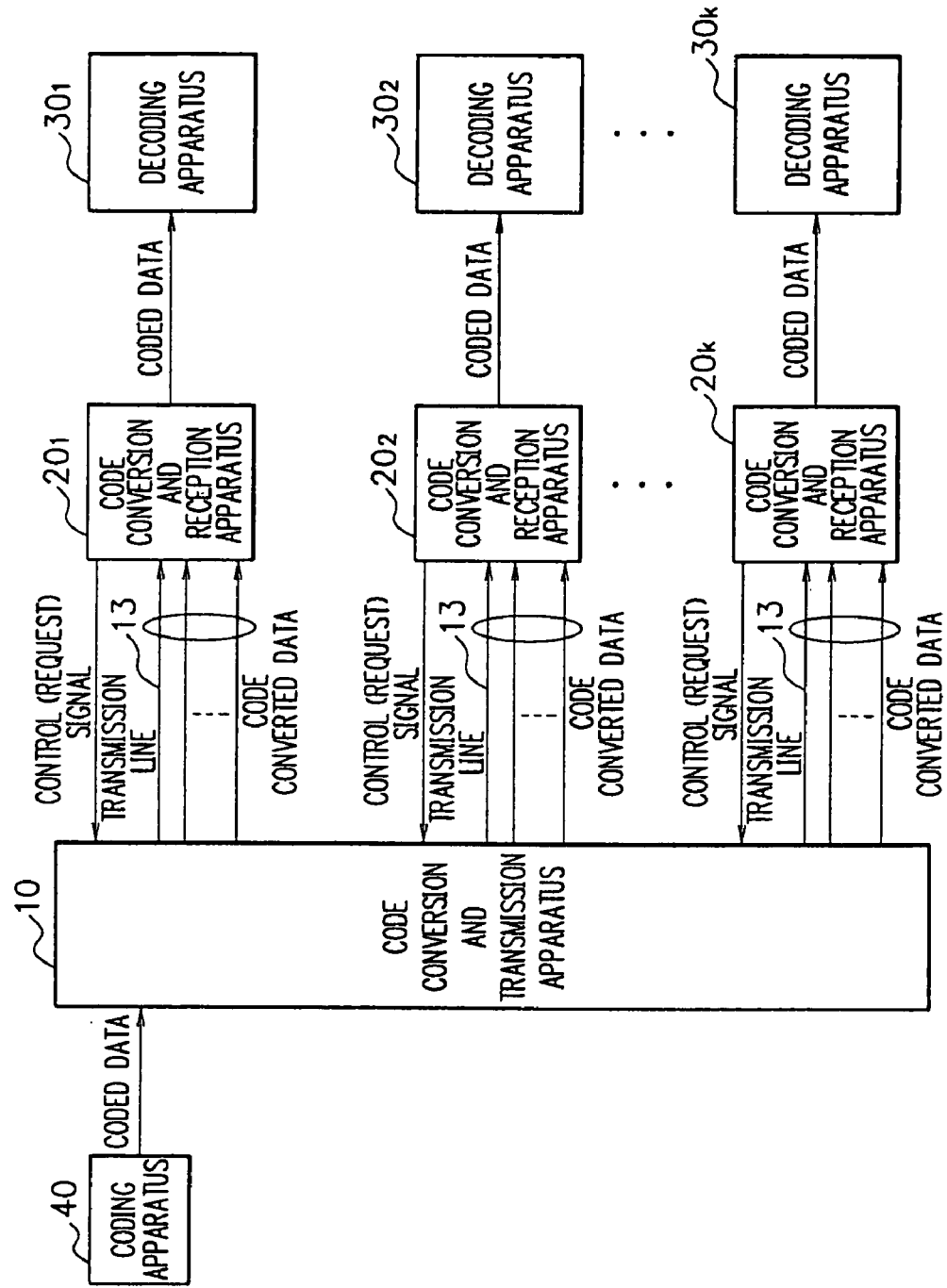
FIG. 15 shows an example of the system configuration according to the eighth embodiment of the present invention.

When control is passed to step S1005, the coded data in the n-th frame output by the first coded data extraction unit 302 is passed to the variable length decoding unit (not shown in the drawings; for example, corresponding to the decoding apparatus shown in FIG. 15) as the coded data to be decoded, and control is passed to step S1008.

When control is passed to step S1006, it is determined according to a detection result of an error and a packet loss by the second error/packet loss detection unit 306 whether or not there is the i-th packet of the n-th frame and there are bit errors in the second packet reception buffer 304.

When the second packet reception buffer 304 receives the i-th packet in the n-th frame, and there are no data errors detected as a result of the determination in step S1006, control is passed to step S1007. Otherwise, control is passed to step S1008.

In step S1007, the coded data in the n-th frame output by the second coded data extraction unit 305 is passed to the variable length decoding unit (not shown in the drawings; for example, corresponding to the decoding apparatus shown in FIG. 15) as the coded data to be decoded, and control is passed to step S1008.

In step S1008, the variable i is incremented by 1. In step S1009, it is determined whether or not the variable i exceeds the value of the variable b. If it does not exceed, the processes from step S1004 are repeated. When the variable i exceeds the variable b, a series of repeated processes are finished, thereby terminating the n-th frame coded data reconfiguring process.

The operation and preferable practical example of each unit other than those according to the present embodiment are similar to those according to the third embodiment.

(4.D) Advantages

According to the above-mentioned fourth embodiment, the audio code conversion and transmission apparatus decodes the input audio data, codes the same audio data into two pieces of coded data, and transmits them at predetermined or adaptively variable time intervals.

The second coded transmission means codes a packet coded by the first coded transmission means. The code conversion and reception apparatus selects coded data having a low compression rate and high audio quality from the correctly received coded data in a packet unit, and outputs the selected data. As a result, even when a less reliable transmission line in which high burst transmission error and packet loss frequently occur is used, the probability that two pieces of coded data are transmitted with errors can be reduced, and the outstanding degradation can be prevented from being generated in decoded audio quality after transmission.

Furthermore, by enhancing the compression rate of the second coded data, the increase of transmission bands during the transmission of second coded data can be suppressed. Additionally, depending on the status of a transmission line and the intention of an audio transmitter or an audio receiver, the first to second coded data can be transmitted to a plurality of transmission lines having different bands, and the influence of an error in the transmission line can be reduced.

Additionally, the code conversion and reception apparatus can decode at least one piece of data from the two pieces of received coded data, thereby suppressing the increase of necessary arithmetic complexity as compared with the common audio decoding apparatus.

According to the present embodiment, the code conversion and transmission apparatus and the code conversion and reception apparatus are combined, but they can be independently used. The first to N-th code converted data can be interleaved other than at time intervals.

[Fifth Mode for Carrying Out the Present Invention]

In the fifth embodiment of the present invention, the code conversion and transmission apparatus includes for an integer N of 2 or larger and an integer M of 1 or larger: a) first audio code conversion and transmission means for inputting coded packet data and transmitting all or a part of packets using predetermined transmission means; b) (N-1) units of the 2 to N-th audio code conversion and transmission means for replicating packets for all packet data coded by the first audio coding means or packet data adaptively selected depending on the characteristic of input audio data or according to a predetermined rule, and transmitting the obtained packet data at predetermined or adaptively variable time intervals using transmission means the same as or different from the transmission means of the first audio code conversion and transmission means; and c) means for transmitting output of the first to N-th audio code conversion and transmission means to the first to M-th transmission lines.

The code conversion and reception apparatus includes d) selection means for selecting at least one transmission line from M transmission lines, receiving N pieces of coded data from the selected transmission line, selecting coded packet data which is received without a transmission error or a loss from the packet data, and outputting the selected data. The process and the function of each means of the above-mentioned code conversion and transmission apparatus and code conversion and reception apparatus can be realized by the program executed by the computer forming the code conversion and transmission apparatus and code conversion and reception apparatus.

Fifth Embodiment

For detailed explanation about the fifth mode for carrying out the present invention, the fifth embodiment of the present invention will be explained referring to the drawings.

(5.A) Summary

Figure 11:
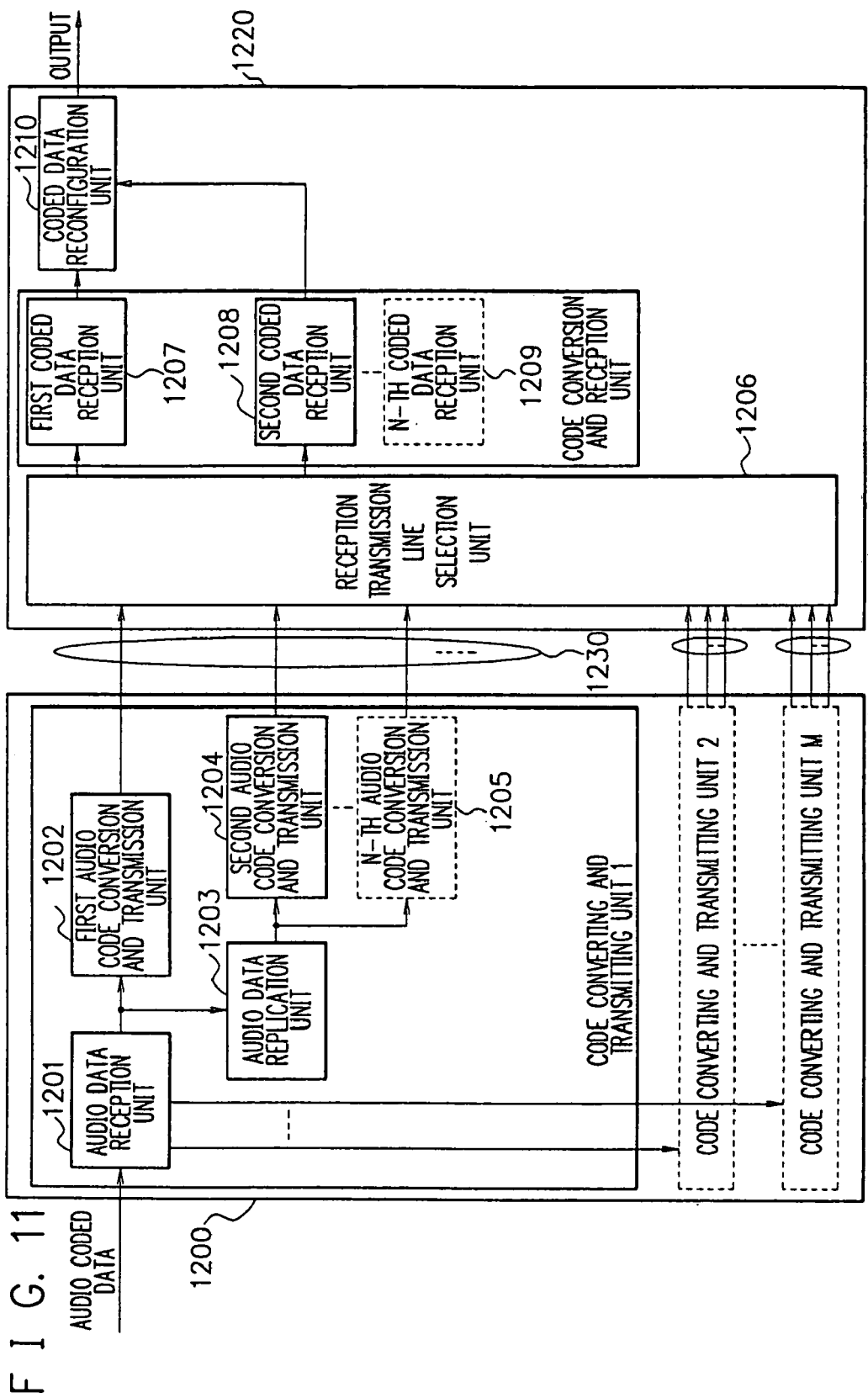
FIG. 11 shows the configuration of the audio data code conversion and transmission system according to the fifth embodiment of the present invention.

FIG. 11 shows the fifth embodiment of the present invention. As shown in FIG. 11, the embodiment of the present invention comprises an audio data code conversion and transmission apparatus 1200, a code conversion and reception apparatus 1220, and transmission lines 1230 for transmitting coded data. An integer N indicates the number of pieces of coded data to be transmitted by the code conversion and transmission apparatus, and is 2 or larger. An integer M indicates the number of transmission lines for transmitting N pieces of coded data, and is 1 or larger. The code conversion and transmission apparatus inputs audio packet data, selects all or a part of the data, and transmits the data to the first to M-th transmission lines.

As shown in FIG. 11, the code conversion and transmission apparatus 1200 is provided with N units of first to N-th audio code conversion and transmission units 1202, 1204, and 1205 for transmitting data to M units of first to M-th transmission lines 1230. An audio data reception unit 1201 receives audio packet data. A first audio code conversion and transmission unit 1202 transmits all or a part of packets of the input audio packet data to the audio code conversion and reception apparatus 1220.

An audio data replication unit 1203 replicates all received packet data or a part of packet data adaptively selected depending on the characteristic of input audio data or according to a predetermined rule, and outputs them to second to N-th audio code conversion and transmission units 1204 and 1205.

The second audio code conversion and transmission units 1204 and 1205 transmits the replicated packets by selecting packet data of the same or different number of pieces of the first audio packet data partly to the audio code conversion and reception apparatus. The first to N-th audio stream is transmitted to the first to M-th transmission lines.

In the audio code conversion and reception apparatus 1220, a reception transmission line selection unit 1206 selects at least one transmission line from M transmission lines to which the code conversion and transmission apparatus transmits data, receives N pieces of coded data from the selected transmission lines, and decodes the data.

As shown in FIG. 12, the code conversion and transmission apparatus 1200 comprises first to N-th coded data reception units 1207, to 1209 for receiving the coded data transmitted from the first to N-th audio code conversion and transmission units 1202, 1204, and 1205, and a coded data reconfiguration unit 1210.

The coded data reconfiguration unit 1210 selects data from among up to N pieces of coded data received without a transmission error or a loss by the coded data reception units 1207 to 1209, and outputs the selected data.

(5.B) Code Conversion and Transmission Apparatus

FIG. 12 shows the detailed configuration of the audio code conversion and transmission apparatus according to the fifth embodiment of the present invention. For simplicity, the number N of pieces of coded data output by the apparatus is set to 2, and the number M of units of transmission lines for transmitting coded data is set to 2. In FIG. 12, a first audio code conversion transmission unit 1300 comprises a first transmitted packets selection unit 1301 for selecting adaptively transmitted packets based on the characteristics of an audio signal and the status of a transmission line from among the input audio packet data; and a first error detection code added frame/packet identification number addition unit 1302 for adding an error detection code and a frame/packet identification number for detection of a transmission error and a packet loss of output coded packet data, and outputs the first coded data.

In FIG. 12, a second audio code conversion and transmission unit 1310 comprises a packet replication unit 1303 for replicating input audio coded packet data, a second transmitted packets selection unit 1304 for selecting a packet adaptively transmitted to a part of packet data adaptively selected depending on the characteristic of input audio signal or according to a predetermined rule from the replicated audio packet data by the number equal to or different from the number of data selected by the first audio code conversion and transmission unit 1300, and a second error detection code added frame/packet identification number addition unit 1305 for adding an error detection code and a packet identification number for detecting a transmission error and a packet loss of the coded packet data output by the second transmitted packets selection unit 1304 by a reception apparatus. The unit outputs the second coded data.

In the present embodiment, M is set to 2, and N is set to 2. Therefore, the first and second audio code conversion and transmission data is transmitted to the two transmission lines, respectively.

The operation of the processing unit other than that described above is the same as that according to the fourth embodiment. A further preferable concrete example of the above-mentioned embodiment is similar to that according to the second embodiment.

The configuration and operation of the audio code conversion and reception apparatus are the same as those according to the fourth embodiment.

(5.C) Advantages

According to the fifth embodiment described above, the audio code conversion and transmission apparatus converts the same audio packet data to two pieces of coded data, and transmits them at predetermined or adaptively variable time intervals. The first audio code conversion and transmission unit adaptively selects input audio packet data depending on the characteristic of input audio data or according to a predetermined rule, and transmits the data. The second audio code conversion and transmission unit replicates all packet data or a part of packet data adaptively selected depending on the characteristic of input audio data or according to a predetermined rule, selects data by the number same as or different from the input data, and then transmits the selected data.

The code conversion and reception apparatus selects data without an error or a loss from correctly received coded packet data in a packet unit, selects high quality data from the data received from two transmission lines, and outputs the selected data. As a result, even when a less reliable transmission line in which high burst transmission error and packet loss frequently occur is used, the probability that two pieces of coded data are transmitted with errors can be reduced, and the outstanding degradation can be prevented from being generated in decoded audio quality after transmission.

Furthermore, by reducing the selection number of the second coded data, the increase of transmission bands during the transmission of second coded data can be suppressed. Additionally, depending on the status of a transmission line and the intention of an audio transmitter or an audio receiver, the first to second coded data can be transmitted to a plurality of transmission lines having different bands, and the influence of an error in the transmission line can be reduced.

Additionally, the code conversion and reception apparatus can decode at least one piece of data from the two pieces of received coded data, thereby suppressing the increase of necessary arithmetic complexity as compared with the common audio decoding apparatus.

According to the present embodiment, the code conversion and transmission apparatus and the code conversion and reception apparatus are combined, but they can be independently used. The first to N-th code converted data can be interleaved other than at time intervals.

[Sixth Mode for Carrying Out the Present Invention]

According to the sixth embodiment of the present invention, the code conversion and transmission apparatus includes for an integer N of 2 or larger and an integer M of 1 or larger: a) first audio code conversion and transmission means for inputting compressed coded data, decoding the input coded data, compressing and coding the data at a compression rate equal to or higher than the rate of the input coded data, and transmitting all frames or a frame adaptively selected depending on the characteristic of input audio data or according to a predetermined rule using predetermined transmission means; b) (N−1) units of the second to N-th audio code conversion and transmission means for decoding input coded data, compressing and coding data at a compression rate equal to or higher than the rate of the first audio code conversion and transmission means, and transmitting all frames of the obtained coded data or a part of frames adaptively selected depending on the characteristic of input audio data or according to a predetermined rule at predetermined or adaptively variable time intervals using transmission means the same as or different from the transmission means of the first audio code conversion and transmission means; and c) means for selecting a compression rate of the first to N-th audio code conversion and transmission means depending on the band available for each of the first to M transmission lines, and transmitting the selected result to the first to M-th transmission lines.

The code conversion and reception apparatus includes d) selection means for selecting at least one transmission line from M transmission lines, receiving N pieces of coded data from the selected transmission line, extracting coded data received without a transmission error or a loss, selecting audio coded data having the lowest compression rate from the coded data in the same frame, and outputting the selected data. The process and function of each means of the above-mentioned code conversion and transmission apparatus and code conversion and reception apparatus can be realized by the program executed by the computer configuring the above-mentioned code conversion and transmission apparatus and code conversion and reception apparatus.

Sixth Embodiment

For detailed explanation about the sixth mode for carrying out the present invention, the sixth embodiment of the present invention will be explained referring to the drawings.

(6.A) Summary

Figure 13:
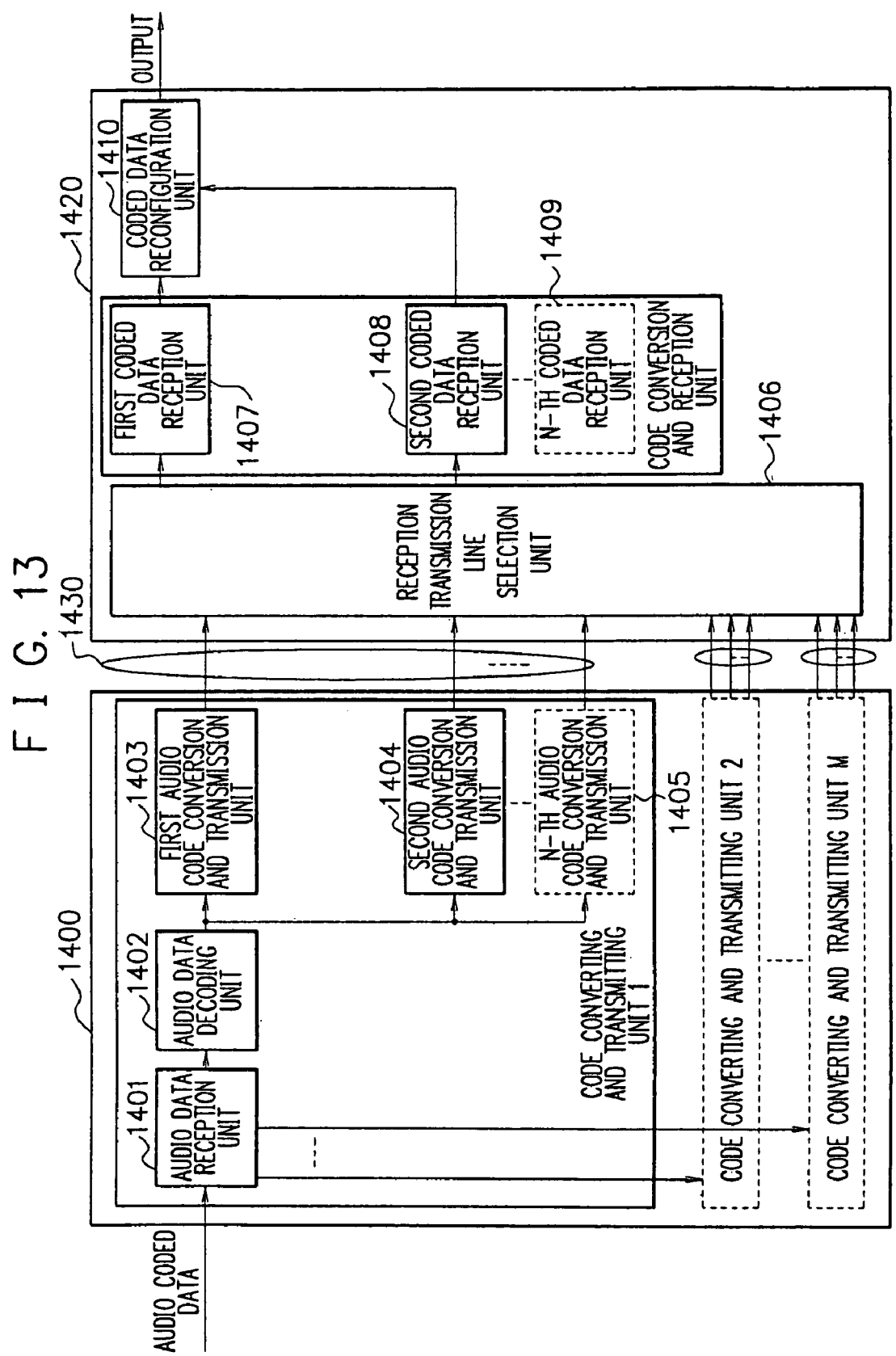
FIG. 13 shows the configuration of the audio code converting and transmitting system according to the sixth and seventh embodiments of the present invention.

FIG. 13 shows the sixth embodiment of the present invention. As shown in FIG. 13, the embodiment of the present invention comprises an audio data code conversion and transmission apparatus 1400, a code conversion and reception apparatus 1420, and transmission lines 1430 for transmitting coded data. An integer N indicates the number of pieces of coded data to be transmitted by the code conversion and transmission apparatus, and is 2 or larger. An integer M indicates the number of transmission lines for transmitting N pieces of coded data, and is 1 or larger.

The audio code conversion and transmission apparatus 1400 decodes input coded audio data, and the obtained audio data is compressed and coded in a predetermined method at a compression rate equal to or higher than the rate of the input data, and transmitted to the audio code conversion and reception apparatus 1420. The input audio data is coded into N pieces of coded data, and transmitted to the first to M-th transmission lines as the first to N-th audio coded data.

As shown in FIG. 13, the audio code conversion and transmission apparatus comprises N units of first to N-th audio code conversion and transmission units (the first to N-th audio code conversion and transmission unit) 1403, 1404, and 1405.

An audio data reception unit 1401 receives audio data.

An audio data decoding unit 1402 decodes input audio coded data.

A first audio code conversion and transmission unit 1403 compresses and codes a frame input to the code conversion and transmission apparatus in a predetermined method, and transmits the obtained coded data to the audio code conversion and reception apparatus.

Second to N-th audio code conversion and transmission units 1404 and 1405 code data at a compression rate equal to or higher than the rate of the first audio code conversion and transmission unit 1403, and transmits the obtained coded data to the audio code conversion and reception apparatus. The first to N-th audio stream is transmitted to the first to M-th transmission lines.

In the present embodiment, the compression rate for coding by the first to N-th audio code conversion and transmission unit 1403 to 1405 can be selected depending on the band available for transmission of audio data by each transmission line 1430. The output of the first to N-th audio code conversion and transmission units 1403 to 1405 is output to the first to M-th transmission lines 1430, thereby transmitting data depending on the status of the transmission line and the intention of the transmitter of audio data.

In the audio code conversion and reception apparatus 1420, a reception transmission line selection unit 1406 selects at least one transmission line from among the M transmission lines used by the audio code conversion and transmission apparatus for transmission, receives N pieces of coded data from the selected transmission line, and decodes the received data.

As shown in FIG. 13, the audio code conversion and reception apparatus 1420 comprises first to N-th coded data reception units 1407 to 1409 for receiving the coded data transmitted by the first to N-th audio code conversion and transmission units 1403 to 1405 of the code conversion and transmission apparatus 1400, and a coded data reconfiguration unit 1410.

The coded data reconfiguration unit 1410 selects the data having the lowest compression rate from among up to N pieces of coded data received without a transmission error or a loss by the coded data reception units 1407 to 1409 and outputs the selected data.

(6.B) Code Conversion and Transmission Apparatus

Figure 14:
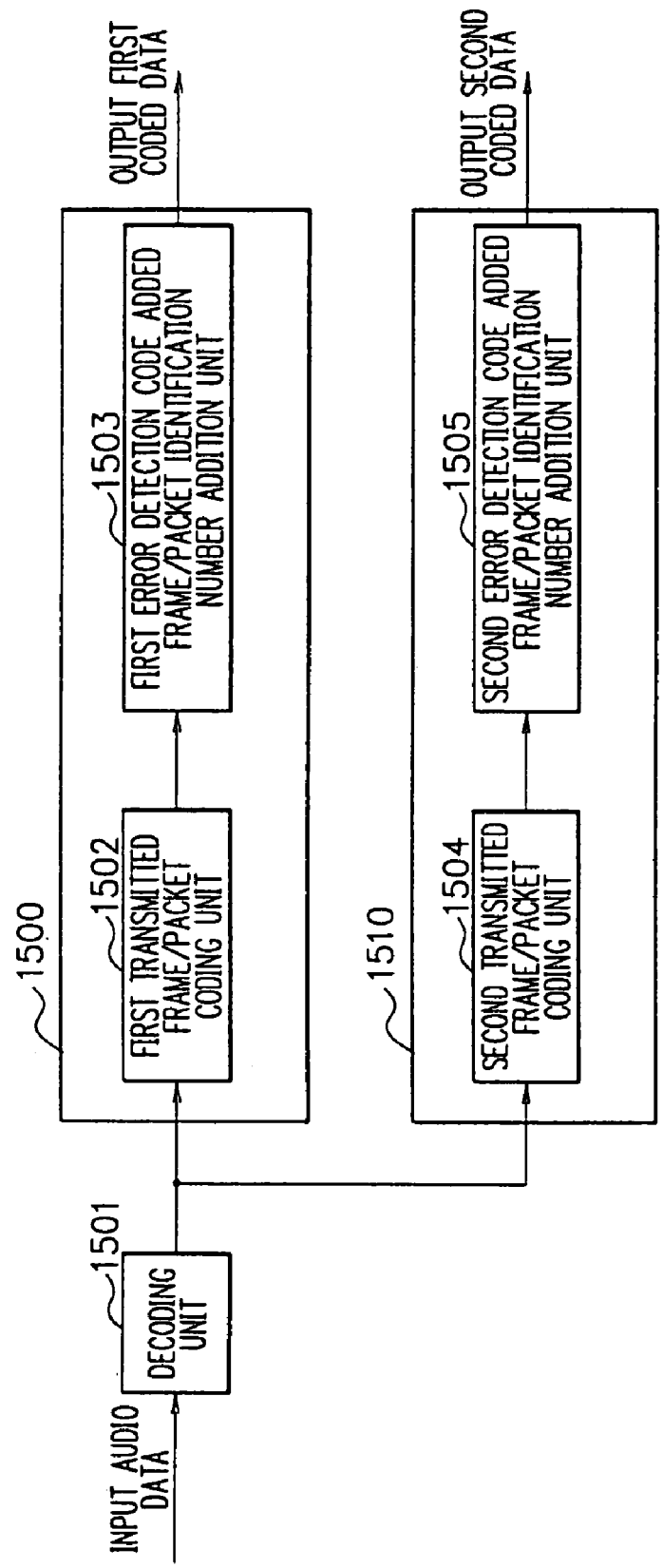
FIG. 14 shows the configuration of the audio code conversion and transmission apparatus according to the sixth and seventh embodiments of the present invention.

FIG. 14 shows the detailed configuration of the audio code conversion and transmission apparatus according to the sixth embodiment of the present invention. For simplicity, the number N of pieces of coded data output by the apparatus is set to 2, and the number M of units of transmission lines for transmitting coded data is set to 2. In FIG. 14, the apparatus comprises a decoding unit 1501 for decoding input audio data, and a first audio code conversion and transmission unit 1500 comprises a first transmitted frame/packet coding unit 1502 for coding decoded audio data at a compression rate equal to or higher than the rate of the input data, and a first error detection code added frame/packet identification number addition unit 1503 for adding an error detection code and a frame/packet identification number for detecting by the reception apparatus a transmission error and a packet loss of the coded data output by the first transmission frame/packet coded unit 1502, outputs the first audio coded data, and transmits the data by predetermined transmission means.

In FIG. 14, a second audio code conversion and transmission unit 1510 comprises a second transmitted frame/packet coding unit 1504 for coding data at a compression rate equal to or higher than the rate of the first audio code conversion and transmission unit 1500 and outputting the coded data, and a second error detection code added frame/packet identification number addition unit 1505 for adding an error detection code and frame/packet identification number for detection of a transmission error and a packet loss of the coded data output by the second transmission frame/packet coded unit 1504 by a receiving apparatus, and the second audio coded data is output and transmitted by predetermined transmission means.

In the present embodiment, M is set to 2, and N is set to 2. Therefore, the first to second audio code conversion and transmission data is transmitted to each of the two transmission lines. The operation of the processing unit other than the above-mentioned operation is similar to that according to the third embodiment.

A further preferable concrete example of the above-mentioned embodiment is similar to that according to the first embodiment.

The configuration and operation of the audio code conversion and reception apparatus are the same as those according to the third embodiment.

(6.C) Advantages

According to the third embodiment described above, the audio code conversion and transmission apparatus decodes input audio data, codes the same audio data into two pieces of coded data, and transmits the coded data at predetermined or adaptively variable time intervals.

The code conversion and reception apparatus selects coded data having a low compression rate and high audio quality from the correctly received coded data in a frame unit, and outputs the selected data. As a result, even when a less reliable transmission line in which high burst transmission error and packet loss frequently occur is used, the probability that two pieces of coded data are transmitted with errors can be reduced, and the outstanding degradation can be prevented from being generated in decoded audio quality after transmission.

Furthermore, by enhancing the compression rate of the second coded data, the increase of transmission bands during the transmission of second coded data can be suppressed.

Additionally, depending on the status of a transmission line and the intention of an audio transmitter or an audio receiver, the first to second coded data can be transmitted to a plurality of transmission lines having different bands, and the influence of an error in the transmission line can be reduced. Additionally, the code conversion and reception apparatus can decode at least one piece of data from the two pieces of received coded data, thereby suppressing the increase of necessary arithmetic complexity as compared with the common audio decoding apparatus.

According to the present embodiment, the code conversion and transmission apparatus and the code conversion and reception apparatus are combined, but they can be independently used. The first to N-th code converted data can be interleaved other than at time intervals.

[Seventh Mode for Carrying Out the Present Invention]

In the seventh embodiment of the present invention, the code conversion and transmission apparatus includes for an integer N of 2 or larger and an integer M of 1 or larger: a) first audio code conversion and transmission means for inputting compressed coded packet data, decoding the input coded packet data, compressing and coding data at a compression rate equal to or higher than the rate of the input coded data, and transmitting all packets or a part of packets adaptively selected depending on the characteristic of input audio data or according to a predetermined rule using predetermined transmission means; b) (N–1) units of the second to N-th audio code conversion and transmission means for decoding input coded packet data, compressing and coding data into packet data at a compression rate equal to or higher than the rate of the first audio code conversion and transmission means; and transmitting all obtained packet data or a part of packet data adaptively selected depending on the characteristic of input audio data or according to a predetermined rule at predetermined or adaptively variable time intervals using transmission means the same as or different from the transmission means of the first audio code conversion and transmission means; and c) means for selecting compression rate for the first to N-th audio code conversion and transmission means depending on the band available for each of the first to M-th transmission lines, and transmitting it to the first to M-th transmission lines.

The code conversion and reception apparatus includes d) selection means for selecting at least one transmission line from M transmission lines, receiving N pieces of coded data from the selected transmission line, selecting coded packet data which has the lowest compression rate from the packet data received without a transmission error or a loss, and outputting the selected data. The process and function of each means of the above-mentioned code conversion and transmission apparatus and code conversion and reception apparatus can be realized by the program executed by the computer configuring the above-mentioned code conversion and transmission apparatus and code conversion and reception apparatus.

Seventh Embodiment

For detailed explanation about the seventh mode for carrying out the present invention, the seventh embodiment of the present invention will be explained referring to the drawings.

(7.A) Summary

The configuration and operation of the present embodiment are substantially the same as those according to the sixth embodiment. As shown in FIG. 13, the embodiment of the present invention comprises the audio code conversion and transmission apparatus 1400, the code conversion and reception apparatus 1420, and the transmission lines 1430 for transmitting coded data. An integer N indicates the number of pieces of coded data to be transmitted by the code conversion and transmission apparatus, and is 2 or larger. An integer M indicates the number of transmission lines for transmitting N pieces of coded data, and is 1 or larger.

The configuration of the audio code conversion and transmission apparatus is substantially the same as that according to the sixth embodiment, but the operation of each unit configuring the apparatus is somewhat different. Described below are the differences.

The input audio coded data is decoded, data is compressed and coded in a predetermined method at a compression rate equal to or higher than the rate of the input audio data, and the code converted data is transmitted to the audio code conversion and reception apparatus.

The input frame coded data coded by the audio image code conversion processing unit is configured by one or more pieces of packet data.

The second to N-th audio code conversion and transmission units codes all or a part of packets coded by the first audio code conversion and transmission unit at a compression rate equal to or higher than the rate of the first audio code conversion and transmission unit, and the obtained coded packet data is transmitted to the audio code conversion and reception apparatus. The operations other than those described above are basically the same as in the sixth embodiment.

The configuration of the audio code conversion and reception apparatus is also substantially the same as that according to the sixth embodiment, but the operation of each unit configuring the apparatus is somewhat different. Described below are the differences.

In FIG. 13, the coded data reconfiguration unit 1410 selects a packet having the lowest compression rate as coded data to be decoded from among up to N pieces of coded packet data which are received without a transmission error or a loss by the first to N-th coded data reception units, and include compressed data in the same frame, and the selection result is transmitted by the code conversion and transmission apparatus in a packet unit as in the sixth embodiment. The operations other than the operations above are basically the same as in the sixth embodiment.

(7.B) Code Conversion and Transmission Apparatus

The configuration and operation of the audio data code conversion and transmission apparatus according to the present embodiment are substantially the same as those of the audio data code conversion and transmission apparatus according to the sixth embodiment shown in FIG. 14, and the operations of only the first transmitted frame/packet coding unit 1502, the second transmitted frame/packet coding unit 1504, the first error detection code added frame/packet identification number addition unit 1503, and the second error detection code added frame/packet identification number addition unit 1505 shown in FIG. 14 are different. Described below are the differences.

In the audio data code conversion and transmission apparatus according to the present embodiment, the first transmitted frame/packet coding unit 1502 and the second transmitted frame/packet coding unit 1504 generate coded packet data such that the frame of the coded packet data generated by the first transmitted frame/packet coding unit 1502 can match the frame of the coded packet data generated by the second transmitted frame/packet coding unit 1504. The operations of the units other than those described above are similar to those according to the sixth embodiment.

A further preferred practical example of the embodiment is similar to that according to the second embodiment. The configuration and operation of the audio code conversion and reception apparatus are the same as those according to the fourth embodiment.

(7.C) Advantages

According to the above-mentioned seventh embodiment, the audio code conversion and transmission apparatus decodes the input audio data, codes the same audio data into two pieces of coded data, and transmits them at predetermined or adaptively variable time intervals. The second coded transmission means codes a packet coded by the first coded transmission means.

The code conversion and reception apparatus selects coded data having a low compression rate and high audio quality from the correctly received coded data in a packet unit, and outputs the selected data. As a result, even when a less reliable transmission line in which high burst transmission error and packet loss frequently occur is used, the probability that two pieces of coded data are transmitted with errors can be reduced, and the outstanding degradation can be prevented from being generated in decoded audio quality after transmission.

Furthermore, by enhancing the compression rate of the second coded data, the increase of transmission bands during the transmission of second coded data can be suppressed. Additionally, depending on the status of a transmission line and the intention of an audio transmitter or an audio receiver, the first to second coded data can be transmitted to a plurality of transmission lines having different bands, and the influence of an error in the transmission line can be reduced.

Additionally, the code conversion and reception apparatus can decode at least one piece of data from the two pieces of received coded data, thereby suppressing the increase of necessary arithmetic complexity as compared with the common audio decoding apparatus.

According to the present embodiment, the code conversion and transmission apparatus and the code conversion and reception apparatus are combined, but they can be independently used. The first to N-th code converted data can be interleaved other than at time intervals.

[Eighth Mode for Carrying Out the Present Invention]

Described below is another embodiment of the present invention. FIG. 15 shows the system configuration of the eighth embodiment of the present invention. In FIG. 15, the system comprises a coding apparatus 40 for outputting coded data, an audio data code conversion and transmission apparatus 10, code conversion and reception apparatuses 20_1_ to 20_K_ for a plurality of (K) audio data, and a plurality of (K) decoding apparatuses $30_1$ to $30_K$ connected to the code conversion and reception apparatuses $20_1$ to $20_K$. The coding apparatus 40 forms an information providing source for distributing coded data, and a well-known server apparatus is used as the apparatus. The code conversion and transmission apparatus 10 comprises the code conversion and transmission apparatus (for example, 100 shown in FIG. 1) according to the present invention as explained above in the above-mentioned first to ninth embodiments.

The plurality of audio data code conversion and reception apparatuses 20 comprise a code conversion and reception apparatus (for example, 120 shown in FIG. 1) according to the present invention as explained above in the above-mentioned first to ninth embodiments. The decoding apparatus 30 is an apparatus (decoder) for decoding and displaying the coded data from the code conversion and reception apparatus 20. A ready-made product can be used.

In the example shown in FIG. 15, one transmission line 13 used in transferring information between the code conversion and transmission apparatus 10 and each of the code conversion and reception apparatuses $20_1$ to $20_K$ is assigned to each code conversion and reception apparatus. That is, in the M transmission lines 130 in the example of FIG. 1, M is assumed to be 1, and there is provided a plurality of code conversion and reception apparatuses 120 in FIG. 1. The code conversion and transmission apparatus 10 is provided with N audio code conversion and transmission units, not shown in the drawings, and N pieces of stream data are output as in each of the above-mentioned embodiments.

As an embodiment of the practical example of the present embodiment of the present invention, the code conversion and transmission apparatus 10 is connected to the Internet communications network (or Intranet), and inputs coded data transmitted using the UDP/IP protocol from the coding apparatus 40. The process of the audio code conversion and transmission unit, not shown in the drawings, of the code conversion and transmission apparatus 10 is performed corresponding to, for example, Real-time Transport Protocol (RTP). The code conversion and reception apparatus 20 can be a client terminal connected to, for example, the Internet communications network.

In the embodiment, when the transmission line is wireless, the code conversion output (N stream data) from the code conversion and transmission apparatus 10 is output through an UDP/IP protocol and a physical layer, and to the destination code conversion and reception apparatus 20 through the base station in the mobile packet communications system network through a router and a gateway, etc. In the code conversion and reception apparatus 20, the data code-converted by the code conversion and transmission apparatus 10 between the coding apparatus 40 and the decoding apparatus 30 is reconfigured into coded data corresponding to the original coding of the coding apparatus 40, and the obtained data is output. The decoding apparatus 30 outputs audio data to the audio output apparatus, not shown in the drawings, by performing a decoding process corresponding to the coding by the coding apparatus 40. The decoding apparatus (decoder) 30 connected to the code conversion and reception apparatus 20 can be configured as a terminal incorporated into the code conversion and reception apparatus 20, or can be provided for a terminal (personal computer), etc. connected for communications with a terminal configuring the code conversion and reception apparatus 20.

In the embodiment, the code conversion and reception apparatus 20 outputs a control signal (request signal) to the code conversion and transmission apparatus 10. The code conversion and transmission apparatus 10 receives the control signal, and transmits coded data to the code conversion and reception apparatus 20. FIG. 15 indicates that the control signal is different from the coded stream output from the code conversion and transmission apparatus 10.

Using the control signal transmitted from the code conversion and reception apparatus 20 to the code conversion and transmission apparatus 10, the system information about the code conversion and reception apparatus 20, for example, an IP address, apparatus information, the coding system available by the decoding apparatus 30 (for example, H.261 or H.263 recommended by ITU-T, MPEG-4 Visual recommended by ISO/IEC), etc. can be provided through the code conversion and transmission apparatus 10 so that the code conversion and transmission apparatus 10 which receives a request signal can perform the code conversion applied to the code conversion and reception apparatus 20 and decoding apparatus 30. According to the present invention, it is obvious that the transmission line can be a cable.

In the configuration shown in FIG. 15, the coded stream data of a plurality of lines (N) output to the transmission lines 13, respectively, from the code conversion and transmission apparatus 10 can be multiplexed by a multiplexer at different time intervals by the delay addition unit as shown in FIG. 5, or N streams of data can be interleaved by the multiplexing unit and the transmission order can be rearranged by the shuffling, thereby transmitting multiplexed output at intervals through a transmission line. It is also possible to provide the delay addition unit and multiplexer as shown in FIG. 5 in the code conversion and transmission apparatus 10. In this case, the code conversion and reception apparatus 20 comprises a separation unit 511 shown in FIG. 5, and the multiplexing transmission packet received by the transmission line selected by the reception transmission line selection unit is separated into a packet of each stream, and the extraction and reconfiguration of coded data are performed. In this embodiment, the coded data from the coding apparatus 40 functioning as an information provider is received by the code conversion and transmission apparatus 10. The code conversion and transmission apparatus 10 performs the conversion for protection against a data loss and data error, transmits data to the code conversion and reception apparatus 20, and coded data can be efficiently transmitted through the transmission line 13. The decoding apparatus 30 performs decoding corresponding to the coding method of the coding apparatus 40.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

As explained above, according to the present invention, even when a less reliable transmission line in which high burst transmission error and packet loss frequently occur is used, the probability that N pieces of coded data are transmitted with errors can be reduced, and the outstanding degradation can be prevented from being generated in decoded audio quality. The reasons will be described below.

That is, according to the present invention, relating to the integer N which is two or larger, and the integer M which is 1 or larger, the code conversion and transmission apparatus comprises the first to N-th audio code conversion and transmission means on the first to M-th transmission lines, and all or a part of the frames or a packets of audio data is transmitted, or after decoding, the audio data is compressed and coded into N pieces of the coded data and transmitted at predetermined or adaptively variable time intervals. The second to N-th audio code conversion and transmission means codes input frames, and the code conversion and reception apparatus selects the coded data having the lowest compression rate and enhanced audio quality from correctly received coded data from the M transmission lines in a frame or a packet unit, and then decoded.

According to the present invention, the status of a transmission line or the transmission based on the intention of audio data transmitter can be reflected in the transmission.

The reason is that, according to the present invention, using the first to M-th transmission lines, the compression rate of the first to N-th audio code conversion and transmission means can be selected depending on the band available in the transmission of audio data in each transmission line.

Furthermore, according to the present invention, the increase of transmission rate by a plurality of coded data transmission processes can be reduced.

Since, according to the present invention, second to N-th audio code conversion and transmission means codes data at a compression rate equal to or higher than the rate of the first audio code conversion and transmission means. The transmission of coded data by the second to N-th audio code conversion and transmission means can be performed only on the frame coded by the first audio code conversion and transmission means.

Furthermore, according to the present invention, the increase of arithmetic complexity, which is required by a receiver, can be reduced.

The reason is that the code conversion and transmission apparatus generates coded data including the same frames, and the code conversion and reception apparatus selects and decodes only one piece of data in a frame or a packet unit from plural pieces of received coded data. Therefore, it is not necessary for the code conversion and reception apparatus to decode plural pieces of received coded data.

The invention claimed is:

1. The audio data code conversion and transmission method, comprising:
    a step of first audio code conversion and transmission means inputting compressed audio coded data, and outputting all or a part of frames of the input compressed audio coded data;
    a step of second to N-th (N is a predetermined integer equal to or larger than 2) audio code conversion and transmission means inputting the compressed audio coded data, decoding all or a part of the input compressed audio coded data, coding the decoded data, and outputting all or a part of frames of the coded data;
    a step of means transmitting output of the first to N-th audio code conversion and transmission means to first to M-th (M is a predetermined integer equal to or larger than 1) transmission lines;
    a step of selecting a transmission line for receiving the coded data from among first to M-th (M is a predetermined integer equal to 1 or larger) transmission lines; and
    a step of receiving the coded data from the selected transmission line, extracting the audio coded data received without a transmission error or a loss, and reconfiguring and outputting the audio coded data based on the extracted coded data.

2. The audio data code conversion and reception method according to claim 1, characterized in that one piece of data is selected based on a compression rate from coded data in a same frame received from the selected transmission line.

3. The audio data code conversion and transmission method comprising:
    a step of first audio code conversion and transmission means inputting compressed audio coded packet data and outputting all or a part of packets of the input compressed audio coded packet data;
    a step of second to N-tb (N is a predetermined integer equal to or larger than 2) audio code conversion and transmission means inputting the compressed audio coded packet data, decoding the input compressed audio coded packet data, coding the decoded packet data, and outputting all or a part of the decoded packet data;

a step of means transmitting output of the first to N-th audio code conversion and transmission means to first to M-th (M is a predetermined integer equal to or larger than 1) transmission lines;

a step of selecting a transmission line for receiving the coded data from among first to M-th (M is a predetermined integer equal to 1 or larger) transmission lines; and a step of receiving the coded data from the selected transmission line, extracting the audio coded data received without a transmission error or a loss, and reconfiguring and outputting the audio coded data based on the extracted coded data.

4. The audio data code conversion and reception method according to claim 3, characterized in that one piece of data is selected based on a compression rate from coded data in a same frame received from the selected transmission line.

5. The audio data code conversion and transmission method comprising:

a step of first audio code conversion and transmission means inputting compressed audio coded data, decoding the input compressed audio coded data, coding the decoded data, and outputting all or a part of frames of the coded data;

a step of second to N-tb (N is a predetermined integer equal to 2 or larger) audio code conversion and transmission means imputing the compressed audio coded data, decoding the input compressed audio coded data, coding the decoded data, and outputting all or a part of frames of the coded data;

a step of means transmitting output of the first to N-th audio code conversion and transmission means to first to M-th (M is a predetermined integer equal to 1 or larger) transmission lines;

a step of selecting a transmission line for receiving the coded data from among first to M-th (M is a predetermined integer equal to 1 or larger) transmission lines; and a step of receiving the coded data from the selected transmission line, extracting the audio coded data received without a transmission error or a loss, and reconfiguring and outputting the audio coded data based on the extracted coded data.

6. The audio data code conversion and reception method according to claim 5, characterized in that one piece of data is selected based on a compression rate from coded data in a same frame received from the selected transmission line.

7. The audio data code conversion and transmission method comprising:

a step of first audio code conversion and transmission means inputting compressed audio coded data, and outputting all or a part of frames of the corn pressed audio coded data;

a step of second to N-th (N is a predetermined integer equal to 2 or larger) audio code conversion and transmission means inputting the compressed audio coded data, decoding the input compressed audio coded data, coding the decoded data, and outputting all or a part of frames of the coded data;

a step of means transmitting output of the first to N-th audio code conversion and transmission means to first to M-th (M is a predetermined integer equal to 1 or larger) transmission lines;

a step of selecting a transmission line for receiving the coded data from among first to M-th (M is a predetermined integer equal to 1 or larger) transmission lines; and a step of receiving the coded data from the selected transmission line, extracting the audio coded data received without a transmission error or a loss, and reconfiguring and outputting the audio coded data based on the extracted coded data.

8. The audio data code conversion and reception method according to claim 7, characterized in that one piece of data is selected based on a compression rate from coded data in a same frame received from the selected transmission line.

9. The audio data code conversion and transmission method, comprising:

a step of first audio code conversion and transmission means inputting compressed audio coded packet data and outputting all or a part of packets of the input compressed audio coded packet data;

a step of second to N-th (N is a predetermined integer equal to or larger than 2) audio code conversion and transmission means inputting the compressed audio coded packet data, decoding the input compressed audio coded packet data, coding the decoded packet data, and outputting all or a part of the packet data;

a step of means transmitting output of the first to N-th audio code conversion and transmission means to first to M-th (M is a predetermined integer equal to or larger than 1) transmission lines;

a step of selecting a transmission line for receiving the coded packet data from among first to M-th (M is a predetermined integer equal to 1 or larger) transmission lines; and a step of receiving the audio coded packet data from the selected transmission line, extracting the coded packet data received without a transmission error or a loss, and reconfiguring and outputting the audio coded packet data based on the extracted coded packet data.

10. The audio data code conversion and reception method according to claim 9, characterized in that one piece of data is selected based on a compression rate from packet data in a same frame received from the selected transmission line.

11. The audio data code conversion and transmission method, comprising:

a step of first audio code conversion and transmission means inputting compressed audio coded packet data, coding packet data obtained by decoding the input compressed audio coded packet data, and outputting the coded packet data;

a step of second to N-th (N is a predetermined integer equal to 2 or larger) audio code conversion and transmission means decoding all or a part of the input compressed audio coded packet data coded by said first audio code conversion and transmission means, coding the decoded packet data, and outputting the coded packet data;

a step of means transmitting output of the first to N-th audio code conversion and transmission means to first to M-th (M is a predetermined integer equal to 1 or larger) transmission lines;

a step of selecting a transmission line for receiving the coded packet data from among first to M-th (M is a predetermined integer equal to b 1 or larger) transmission lines; and a step of receiving the audio coded packet data from the selected transmission line, extracting the coded packet data received without a transmission error or a loss, and reconfiguring and outputting the audio coded packet data based on the extracted coded packet data.

12. The audio data code conversion and reception method according to claim 11, characterized in that one piece of data is selected based on a compression rate from packet data in a same frame received from the selected transmission line.

13. The audio data code conversion and transmission method, comprising:
- a step of first audio code conversion and transmission means inputting compressed audio coded packet data, and outputting all or a part of the input compressed audio coded packet data;
- a step of second to N-th (N is a predetermined integer equal to 2 or larger) audio code conversion and transmission means replicating a packet for all or a part of packet data of the compressed audio coded packet data input to said first audio code conversion and transmission means, and outputting the replicated packet data;
- a step of means transmitting output of the first to N-th audio code conversion and transmission means to first to M-th (M is a predetermined integer equal to 1 or larger) transmission lines;
- a step of selecting a transmission line for receiving the coded packet data from among first to M-th (M is a predetermined integer equal to 1 or larger) transmission lines; and
- a step of receiving the audio coded packet data from the selected transmission line, extracting the coded packet data received without a transmission error or a loss, and reconfiguring and outputting the audio coded packet data based on the extracted coded packet data.

14. The audio data code conversion and reception method according to claim 13, characterized in that one piece of data is selected based on a compression rate from packet data in a same frame received from the selected transmission line.

15. The audio data code conversion and transmission method, comprising:
- a step of first audio code conversion and transmission means inputting compressed audio coded packet data, decoding the input compressed audio coded packet data, coding the decoded packet data, and outputting all or a part of the coded packet data;
- a step of second to N-tb (N is a predetermined integer equal to 2 or larger) audio code conversion and transmission means inputting the compressed audio coded packet data, decoding the input compressed audio coded packet data, coding the decoded packet data, and outputting all or a part of the coded packet data;
- a step of means transmitting output of the first to N-tb audio code conversion and transmission means to first to M-th (M is a predetermined integer equal to 1 or larger) transmission lines;
- a step of selecting a transmission line for receiving the coded packet data from among first to M-th (M is a predetermined integer equal to 1 or larger) transmission lines; and
- a step of receiving the audio coded packet data from the selected transmission line, extracting the coded packet data received without a transmission error or a loss, and reconfiguring and outputting the audio coded packet data based on the extracted coded packet data.

16. The audio data code conversion and reception method according to claim 15, characterized in that one piece of data is selected based on a compression rate from packet data in a same frame received from the selected transmission line.

* * * * *

UNITED STATES PATENT AND TRADEMARK OFFICE
CERTIFICATE OF CORRECTION

PATENT NO. : 7,298,295 B2  Page 1 of 1
APPLICATION NO. : 11/443692
DATED : November 20, 2007
INVENTOR(S) : Kazunori Ozawa et al.

It is certified that error appears in the above-identified patent and that said Letters Patent is hereby corrected as shown below:

On Title Page
Related U.S. Application Data add

Item (62)   The present application is a divisional application of application Serial Number 10/512,648 filed on October 25, 2004, now U.S. Patent 7,180,434, as a 371 application based on PCT/JP03/05183 filed April 23, 2003.

Signed and Sealed this

Fourteenth Day of October, 2008

JON W. DUDAS
*Director of the United States Patent and Trademark Office*